United States Patent
Kim et al.

(10) Patent No.: US 11,451,791 B2
(45) Date of Patent: Sep. 20, 2022

(54) VIDEO SIGNAL PROCESSING METHOD AND DEVICE

(71) Applicant: WILUS INSTITUTE OF STANDARDS AND TECHNOLOGY INC., Seongnam-si (KR)

(72) Inventors: Dongcheol Kim, Suwon-si (KR); Geonjung Ko, Seoul (KR); Jaehong Jung, Seoul (KR); Juhyung Son, Uiwang-si (KR); Jinsam Kwak, Anyang-si (KR)

(73) Assignee: WILUS INSTITUTE OF STANDARDS AND TECHNOLOGY INC., Seongnam-si (KR)

( * ) Notice: Subject to any disclaimer, the term of this patent is extended or adjusted under 35 U.S.C. 154(b) by 0 days.

(21) Appl. No.: 16/964,949

(22) PCT Filed: Jan. 25, 2019

(86) PCT No.: PCT/KR2019/001133
§ 371 (c)(1),
(2) Date: Jul. 24, 2020

(87) PCT Pub. No.: WO2019/147087
PCT Pub. Date: Aug. 1, 2019

(65) Prior Publication Data
US 2021/0044808 A1 Feb. 11, 2021

(30) Foreign Application Priority Data

Jan. 25, 2018 (KR) .................. 10-2018-0009660
Feb. 28, 2018 (KR) .................. 10-2018-0024866
Jul. 31, 2018 (KR) .................. 10-2018-0089574

(51) Int. Cl.
*H04N 19/159* (2014.01)
*H04N 19/11* (2014.01)
(Continued)

(52) U.S. Cl.
CPC ......... *H04N 19/159* (2014.11); *H04N 19/105* (2014.11); *H04N 19/11* (2014.11);
(Continued)

(58) Field of Classification Search
CPC .......................... H04N 19/159; H04N 19/105
See application file for complete search history.

(56) References Cited

U.S. PATENT DOCUMENTS

2014/0010306 A1* 1/2014 Francois .............. H04N 19/513
375/240.16
2015/0063438 A1* 3/2015 Kim .................... H04N 19/129
375/240.02
(Continued)

FOREIGN PATENT DOCUMENTS

EP 2 665 274 A1 11/2013
WO 2014/166381 A1 10/2014
(Continued)

OTHER PUBLICATIONS

International Search Report & Written Opinion of the International Searching Authoriity_PCT/KR2019/001133—dated May 14, 2019.

*Primary Examiner* — Irfan Habib

(57) ABSTRACT

Disclosed is a video signal processing method and device for encoding or decoding a video signal. More specifically, disclosed are a video signal processing method and a video signal processing device for performing the method, the method comprising: obtaining reference line information indicating a reference line for intra prediction of a current block among a plurality of reference lines comprising neighboring samples of the current block; determining, on the basis of the reference line information, an intra prediction mode for the current block among a plurality of intra prediction modes constituting an intra prediction mode set; and decoding the current block on the basis of a plurality of (Continued)

(a)

(b)

reference samples on the reference line according to the reference line information and the determined intra prediction mode.

18 Claims, 20 Drawing Sheets

(51) Int. Cl.
*H04N 19/176* (2014.01)
*H04N 19/593* (2014.01)
*H04N 19/117* (2014.01)
*H04N 19/105* (2014.01)
H04N 19/124 (2014.01)
H04N 19/13 (2014.01)

(52) U.S. Cl.
CPC ......... *H04N 19/176* (2014.11); *H04N 19/593* (2014.11); *H04N 19/117* (2014.11); *H04N 19/124* (2014.11); *H04N 19/13* (2014.11)

(56) References Cited

U.S. PATENT DOCUMENTS

| | | | |
|---|---|---|---|
| 2016/0173888 A1* | 6/2016 | Park | H04N 19/196 |
| | | | 375/240.08 |
| 2017/0188028 A1* | 6/2017 | Park | H04N 19/52 |
| 2017/0272759 A1* | 9/2017 | Seregin | H04N 19/186 |
| 2018/0262756 A1* | 9/2018 | Filippov | H04N 19/13 |
| 2019/0174128 A1* | 6/2019 | Jang | H04N 19/11 |
| 2020/0195960 A1* | 6/2020 | Zhang | H04N 19/70 |
| 2020/0267383 A1* | 8/2020 | Jun | H04N 19/105 |
| 2020/0296388 A1* | 9/2020 | Bordes | H04N 19/147 |
| 2020/0396483 A1* | 12/2020 | Heo | H04N 19/176 |

FOREIGN PATENT DOCUMENTS

| | | |
|---|---|---|
| WO | 2016/200235 A1 | 12/2016 |
| WO | 2017/138791 A1 | 8/2017 |

* cited by examiner

| Condition | Replaced intra prediction modes |
|---|---|
| W / H == 2 | Modes 2,3,4,5,6,7 |
| W / H > 2 | Modes 2,3,4,5,6,7,8,9,10,11,12,13,14,15 |
| W / H == 1 | None |
| W / H == 1/2 | Modes 61,62,63,64,65,66 |
| W / H < 1/2 | Modes 53,54,55,56,57,58,59,60,61,62,63,64,65,66 |

| Mode Index | Actual Mode | wT | wL | wTL |
|---|---|---|---|---|
| 2 (Top-right diagonal) | 2 (Top-right diagonal) | $16 >> ((y'<<1) >> shift)$ | $16 >> ((x'<<1) >> shift)$ | 0 |
| 3~10 | 3~10 | $32 >> ((y'<<1) >> shift)$ | 0 | 0 |
| 58~65 | 58~65 | 0 | $32 >> ((x'<<1) >> shift)$ | 0 |
| 66 (Bottom-left diagonal) | 66 (Bottom-left diagonal) | $16 >> ((y'<<1) >> shift)$ | $16 >> ((x'<<1) >> shift)$ | 0 |

(a) W/H==1 (Square Block)

| Mode Index | Actual Mode | wT | wL | wTL |
|---|---|---|---|---|
| 2 | 67 (Wide angular mode) | 0 | $32 >> ((x'<<1) >> shift)$ | 0 |
| 3~7 | 68~72 (Wide angular modes) | 0 | $32 >> ((x'<<1) >> shift)$ | 0 |
| 8~10 | 8~10 | $32 >> ((y'<<1) >> shift)$ | 0 | 0 |
| 58~65 | 58~65 | 0 | $32 >> ((x'<<1) >> shift)$ | 0 |
| 66 (Bottom-left diagonal) | 66 (Bottom-left diagonal) | $16 >> ((y'<<1) >> shift)$ | $16 >> ((x'<<1) >> shift)$ | 0 |

(b) W/H==2 (Horizontally Rectangular Block)

*FIG. 17*

| Mode Index | Actual Mode | wT | wL | wTL |
|---|---|---|---|---|
| 2 (Top-right diagonal) | 2 (Top-right diagonal) | 16 >> ( ( y'<<1 ) >> shift ) | 16 >> ( ( x'<<1 ) >> shift ) | 0 |
| 3~10 | 3~10 | 32 >> ( ( y'<<1 ) >> shift ) | 0 | 0 |
| 58~65 | 58~65 | 0 | 32 >> ( ( x'<<1 ) >> shift ) | 0 |
| 66 (Bottom-left diagonal) | 66 (Bottom-left diagonal) | 16 >> ( ( y'<<1 ) >> shift ) | 16 >> ( ( x'<<1 ) >> shift ) | 0 |

(a) W/H==1 (Square Block)

| Mode Index | Actual Mode | wT | wL | wTL |
|---|---|---|---|---|
| 2 | 67 (Wide angular mode) | 16 >> ( ( y'<<1 ) >> shift ) | 16 >> ( ( x'<<1 ) >> shift ) | 0 |
| 3~7 | 68~72 (Wide angular modes) | 16 >> ( ( y'<<1 ) >> shift ) | 16 >> ( ( x'<<1 ) >> shift ) | 0 |
| 8~10 | 8~10 | 32 >> ( ( y'<<1 ) >> shift ) | 0 | 0 |
| 58~65 | 58~65 | 0 | 32 >> ( ( x'<<1 ) >> shift ) | 0 |
| 66 (Bottom-left diagonal) | 66 (Bottom-left diagonal) | 16 >> ( ( y'<<1 ) >> shift ) | 16 >> ( ( x'<<1 ) >> shift ) | 0 |

(b) W/H==2 (Horizontally Rectangular Block)

FIG. 18

VIDEO SIGNAL PROCESSING METHOD AND DEVICE

CROSS-REFERENCE TO RELATED APPLICATIONS

This application is a National Stage Entry of PCT International Application No. PCT/KR2019/001133, which was filed on Jan. 25, 2019, and which claims priority from and the benefit of Korean Patent Application 10-2018-0009660, filed with the Korean Intellectual Property Office on Jan. 25, 2018, Korean Patent Application 10-2018-0024866, filed with the Korean Intellectual Property Office on Feb. 28, 2018, and Korean Patent Application 10-2018-0089574, filed with the Korean Intellectual Property Office on Jul. 31, 2018, the disclosure of which are hereby incorporated by reference in its entirety.

TECHNICAL FIELD

The present invention relates to a video signal processing method and apparatus, and more particularly, to a video signal processing method and apparatus for encoding or decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE

Technical Problem

The present invention has an object to increase the coding efficiency of a video signal. In addition, the present invention has an object to increase signaling efficiency when predicting a current block using prediction information of neighbor blocks.

Technical Solution

In order to solve the above problems, the present invention provides the following video signal processing apparatus and video signal processing method.

First, according to an embodiment of the present invention, a video signal processing method includes: generating a first prediction sample of a current sample included in a current block based on an intra prediction mode for the current block, wherein the intra prediction mode for the current block is indicated through any one of at least one intra prediction mode index included in a specific index set; determining at least one reference sample corresponding to the current sample among reference samples of the current block based on the intra prediction mode for the current block; obtaining at least one reference value corresponding to the current sample based on an unfiltered sample value of the at least one reference sample; generating a second prediction sample of the current sample by linearly combining a value of the first prediction sample and the at least one reference value based on a parameter set corresponding to the specific index set; and restoring the current sample based on a residual signal of the current sample and the second prediction sample, wherein the parameter set corresponding to the specific index set is different according to a shape of the current block.

In addition, according to an embodiment of the present invention, a video signal processing device includes a processor, wherein the processor is configured to: generate, based on an intra prediction mode for the current block, a first prediction sample of a current sample included in a current block, wherein the intra prediction mode for the current block is indicated through any one of at least one intra prediction mode index included in a specific index set; determine at least one reference sample corresponding to the current sample among reference samples of the current block based on the intra prediction mode for the current block; obtain at least one reference value corresponding to the current sample based on an unfiltered sample value of the at least one reference sample; generate a second prediction sample of the current sample by linearly combining a value of the first prediction sample and the at least one reference value based on a parameter set corresponding to the specific index set; and restores the current sample based on a residual signal of the current sample and the second prediction sample, wherein the parameter set corresponding to the specific index set is different according to a shape of the current block.

When the shape of the current block is a vertical rectangle, the processor may be configured to generate, based on a first parameter set, the second prediction sample by linearly combining the first prediction sample and the at least one reference value, and when the shape of the current block is a horizontal rectangle, the processor may be configured to generate, based on a second parameter set, the second prediction sample by linearly combining the first prediction sample and the at least one reference value.

The specific index set may be one of a first index set and a second index set, wherein the first index set may be a set composed of intra prediction mode indexes larger than the smallest index among intra prediction mode indexes indicating an angular mode and smaller than or equal to a pre-configured first index, wherein the second index set may be a set composed of intra prediction mode indexes that are smaller than the largest index among the intra prediction mode indexes indicating the angular mode and are equal to or greater than the pre-configured second index.

The first index and the second index may be configured values based on the number of pre-configured wide-angular modes when the longer one of a width and height of the current block is twice as the shorter one, wherein the wide-angular mode may be an angular mode outside a pre-configured reference angle range.

For at least some of the samples included in the current block, in the first parameter set, a parameter applied to an upper reference value obtained from an upper reference sample of the current block among the at least one reference value may not be 0, wherein for at least some of the samples included in the current block, in the second parameter set, a parameter applied to a left reference value obtained from a left reference sample of the current block among the at least one reference value may not be 0.

An index indicating the intra prediction mode of the current block may be any one of the indexes included in the first index set, wherein when the shape of the current block is a square, the processor may be configured to generate the second prediction sample based on the first parameter set.

The index indicating the intra prediction mode of the current block may be any one of the indexes included in the second index set. In this case, when the shape of the current block is a square, the processor may be configured to generate the second prediction sample based on the second parameter set.

The specific index set may be a third index set composed of the smallest index among the intra prediction mode indexes indicating the angular mode. In this case, when the shape of the current block is a square or vertical rectangle, the parameter applied to the left reference value of the parameter set may not be 0, and when the shape of the current block is a horizontal rectangle, the parameter applied to the left reference value of the parameter set may be 0.

The specific index set is a fourth index set composed of the largest index among the intra prediction mode indexes indicating the angular mode. In this case, when the shape of the current block is a square or horizontal rectangle, the parameter applied to the upper reference value of the parameter set may not be 0, and when the shape of the current block is a vertical rectangle, the parameter applied to the upper reference value of the parameter set may be 0.

When a first position where an opposite direction of a prediction direction indicated by the intra prediction mode for the current block and one of the reference lines of the current block intersect based on a direction of the current sample, the processor may be configured to obtain a reference value corresponding to the first position based on a first distance between the first position and the first reference sample and a distance between the first position and the second reference sample.

Advantageous Effects

According to an embodiment of the present invention, coding efficiency of a video signal may be increased. In addition, according to an embodiment of the present invention, signaling efficiency related to intra prediction of a current block may be increased.

DESCRIPTION OF DRAWINGS

FIG. 17 is a diagram illustrating an embodiment of a PDPC parameter set according to the shape of a current block for each intra prediction mode index.

FIG. 18 is a diagram illustrating another embodiment of a PDPC parameter set according to the shape of a current block for each intra prediction mode index.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and, in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
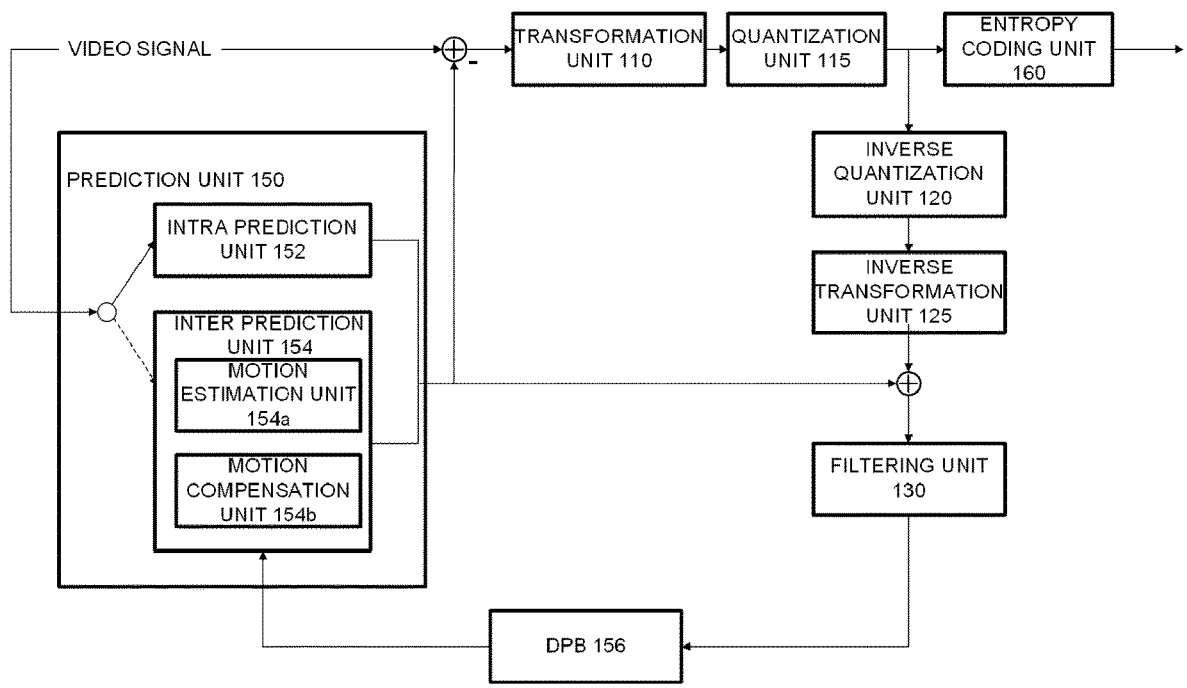
FIG. 1 is a schematic block diagram of a video signal encoding device according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DPB 156. The intra prediction unit 152 performs intra prediction from reconstructed samples in the current picture, and transmits intra coding information to the entropy coding unit 160. The intra encoding information may include at least one of an intra prediction mode, a Most Probable Mode (MPM) flag, and an MPM index. The inter prediction unit 154 may include a motion estimation unit 154a and a motion compensation unit 154b. The motion estimation unit 154a refers to a specific region of the reconstructed reference picture to obtain a motion vector value of the current region. The motion estimation unit 154a transmits motion information (reference picture index, motion vector information, etc.) on the reference region to the entropy coding unit 160. The motion compensation unit 154b performs motion compensation using the motion vector value transmitted from the motion estimation unit 154a. The inter prediction unit 154 transmits inter encoding information including motion information on a reference region to the entropy coding unit 160.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes quantized transform coefficients, intra coding information, and inter coding information to generate a video signal bitstream. In the entropy coding unit 160, a variable length coding (VLC) method, an arithmetic coding method, or the like can be used. The VLC method transforms inputted symbols into successive codewords, and the length of the codewords may be variable. For example, frequently occurring symbols are expressed as short codewords, and less frequently occurring symbols are expressed as long codewords. As the VLC method, a context-based adaptive variable length coding (CAVLC) method may be used. Arithmetic coding transforms successive data symbols into a single decimal point, and arithmetic coding can obtain the optimal number of decimal bits needed to represent each symbol. As arithmetic coding, context-based adaptive arithmetic coding (CABAC) may be used.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
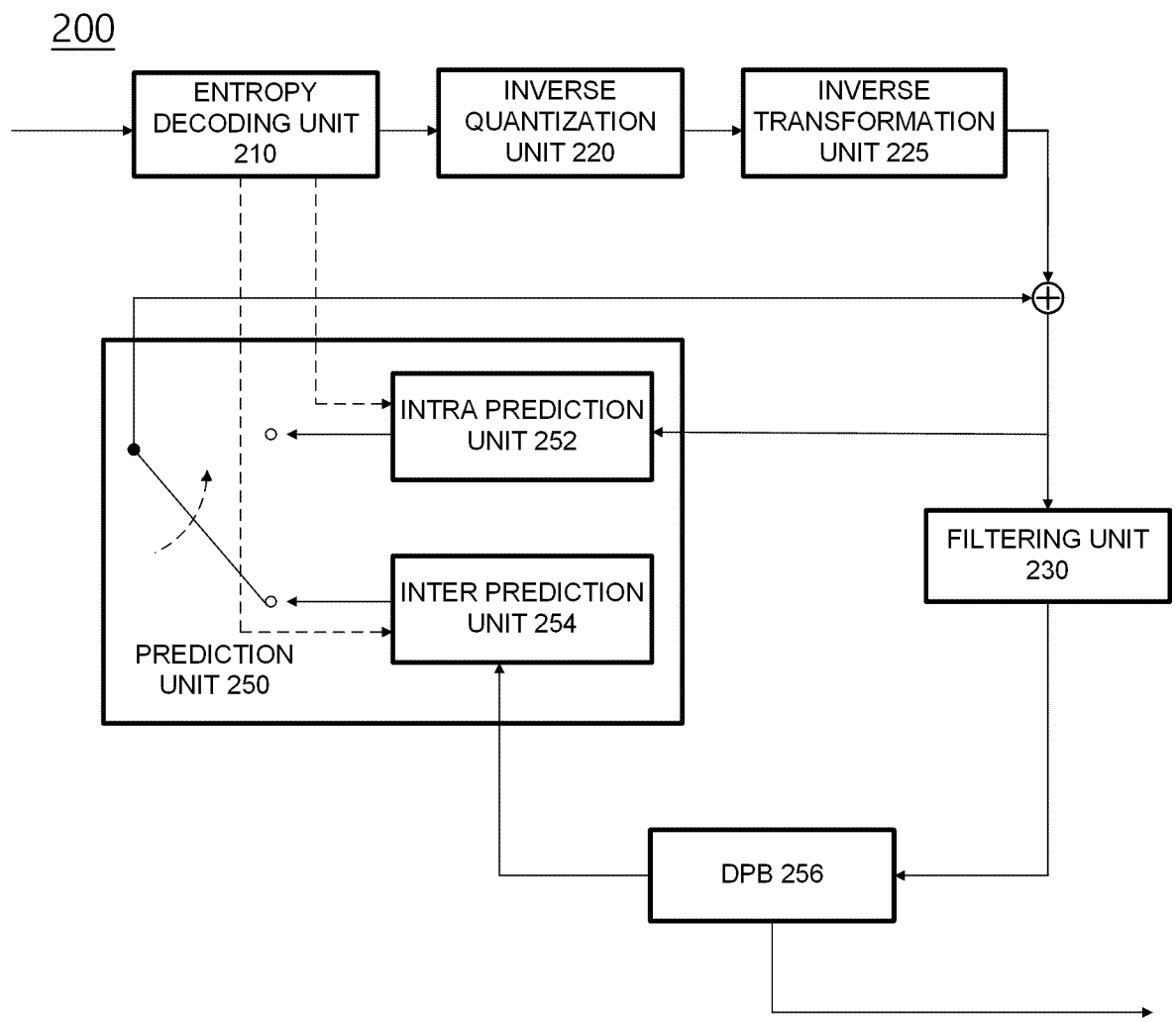
FIG. 2 is a schematic block diagram of a video signal decoding device according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream, and extracts transform coefficients, intra encoding information, and inter encoding information for each region. The inverse quantization unit 220 inverse-quantizes the entropy decoded transform coefficient, and the inverse transformation unit 225 reconstructs the residual value using the inverse quantized transform coefficient. The video signal processing apparatus 200 reconstructs the original pixel value by adding the residual value obtained in the inverse transformation unit 225 and the prediction value obtained in the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs only intra prediction, is called an intra picture or an I picture (or, tile/slice), and a picture (or, tile/slice) that can perform both intra prediction and inter prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and restored samples in the current picture. As described above, the intra encoding information may include at least one of an intra prediction mode, a Most Probable Mode (MPM) flag, and an MPM index. The intra prediction unit 252 predicts the sample values of the current block by using the restored samples located on the left and/or upper side of the current block as reference samples. In this disclosure, restored samples, reference samples, and samples of the current block may represent pixels. Also, sample values may represent pixel values.

According to an embodiment, the reference samples may be samples included in a neighboring block of the current block. For example, the reference samples may be samples adjacent to the left boundary of the current block and/or samples adjacent to the upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect.

The inter prediction unit 254 may obtain a reference block of the current block using a motion vector and a reference picture index. The reference block is in a reference picture corresponding to a reference picture index. Also, a pixel value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously using motion information.

The reconstructed video picture is generated by adding the prediction value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
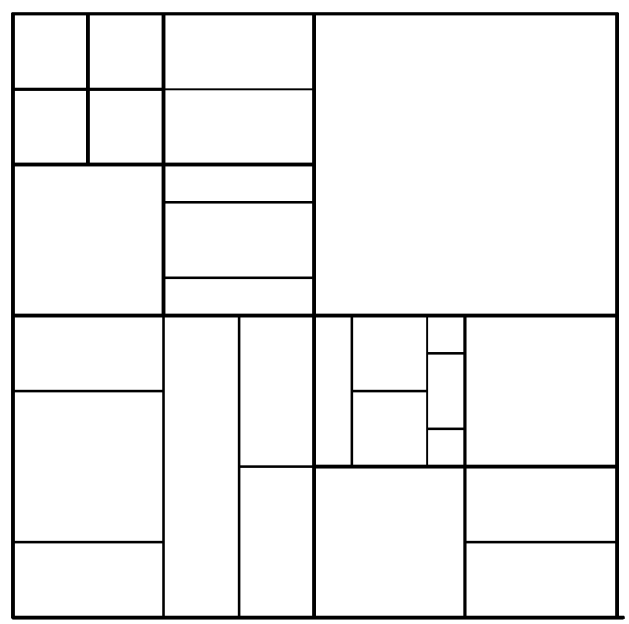
FIG. 3 illustrates an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

The leaf node of the multi-type tree can be a coding unit. If the coding unit is not too large for the maximum transform length, the coding unit is used as a unit of prediction and transform without further division. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
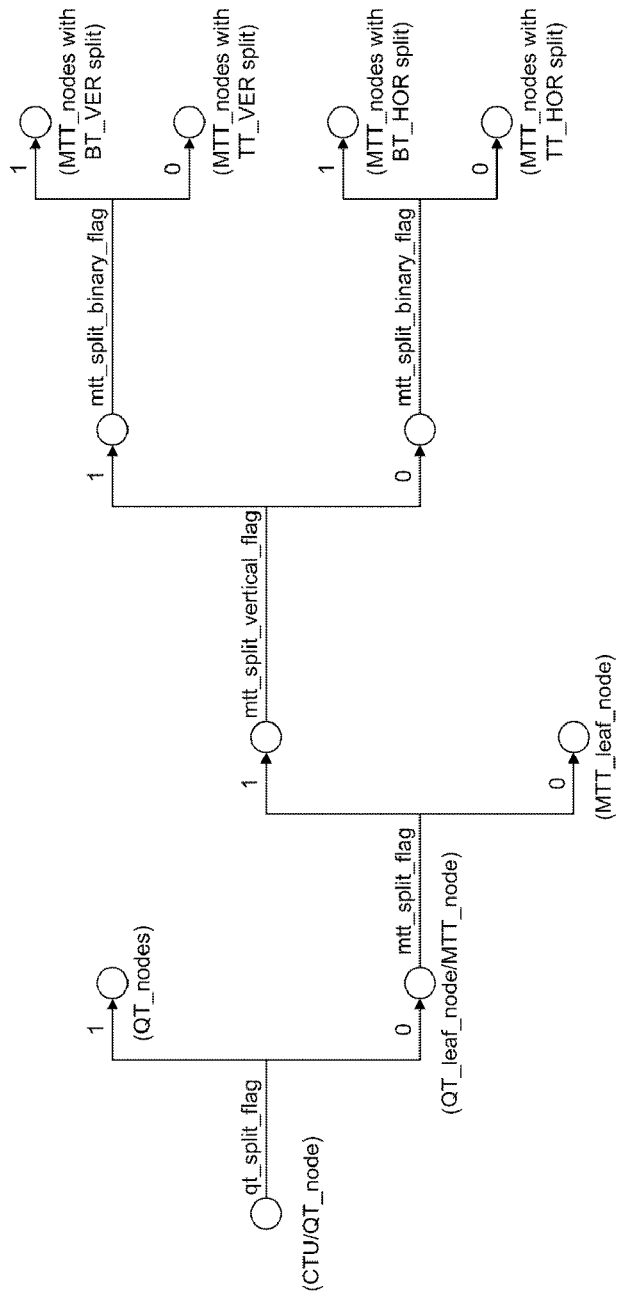
FIG. 4 illustrates an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and can be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Figure 5:
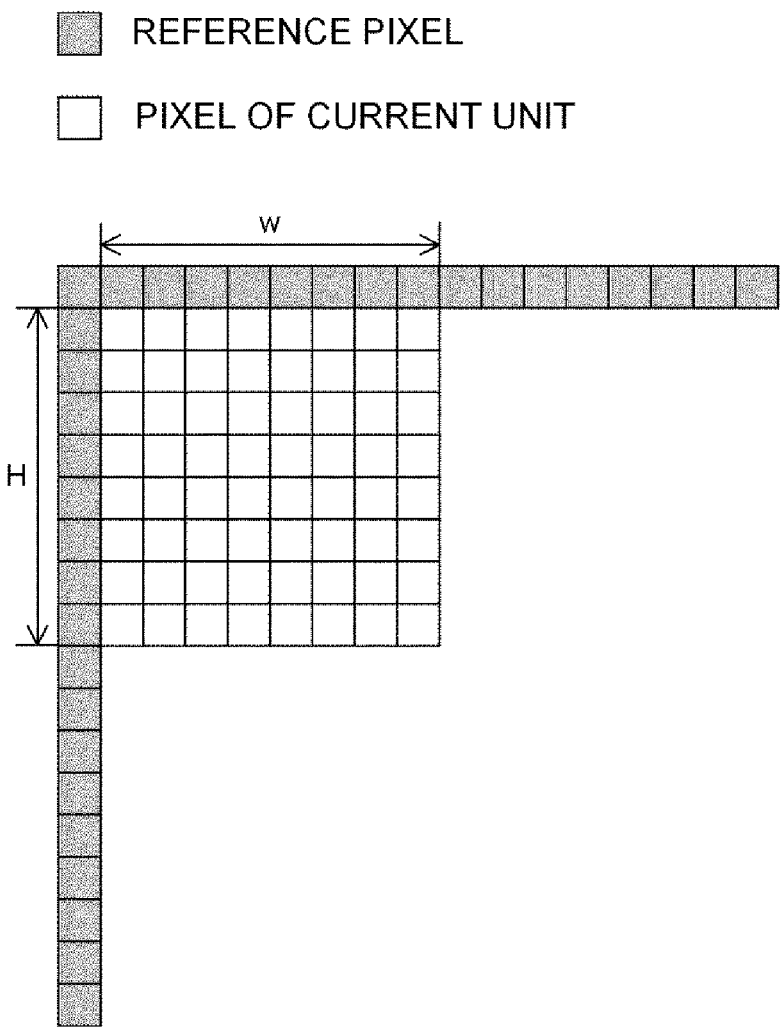
FIG. 5 illustrates an embodiment of reference samples used for prediction of a current block in an intra prediction mode.
Figure 6:
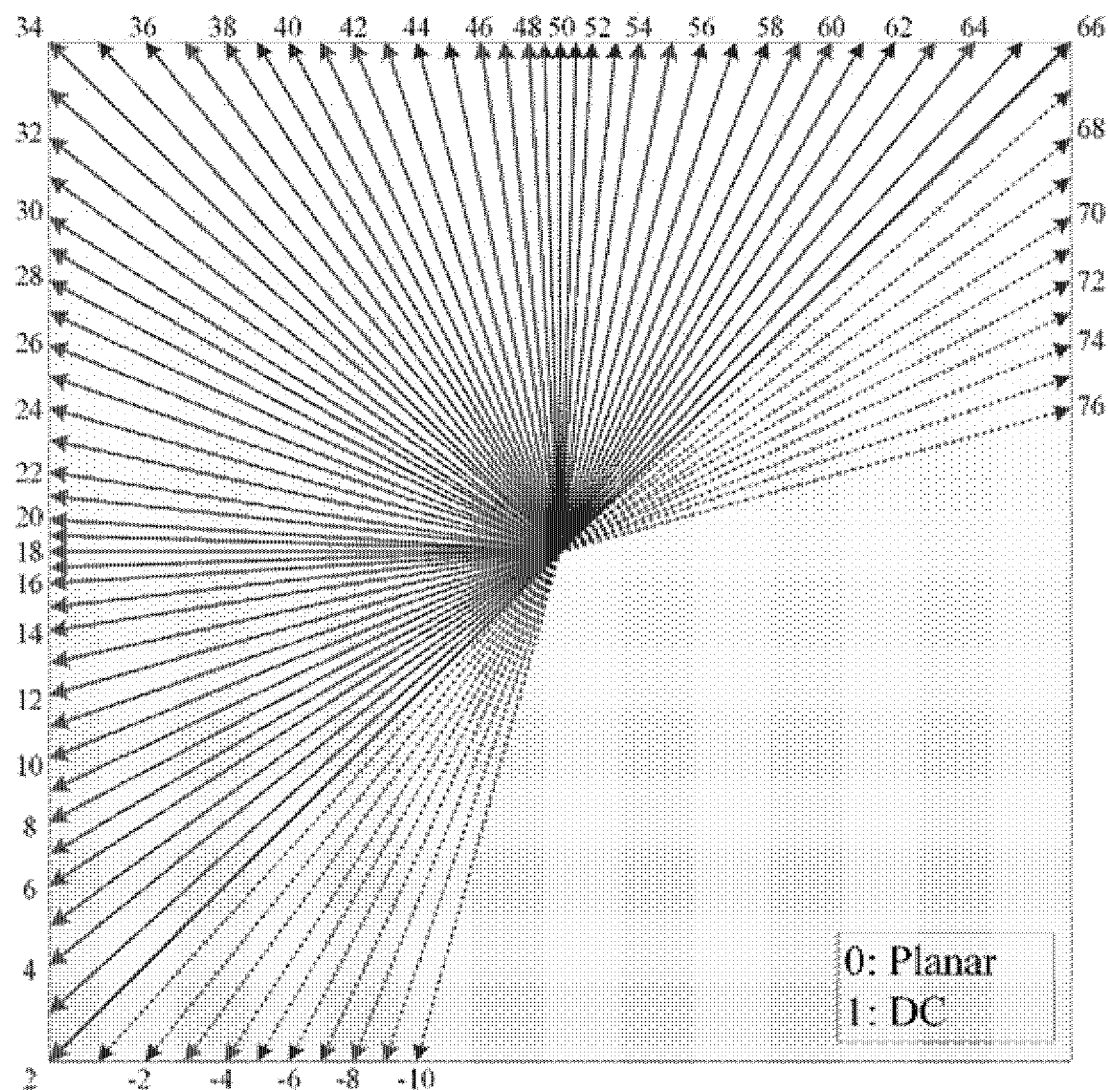
FIG. 6 illustrates an embodiment of prediction modes used for intra prediction.

FIGS. 5 and 6 more specifically illustrate an intra prediction method according to an embodiment of the present invention. As described above, the intra prediction unit predicts the sample values of the current block by using the restored samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2W+2H+1 neighboring samples located on the left and/or upper side of the current block. According to a further embodiment of the present invention, samples on a plurality of reference lines may be used for intra prediction of the current block. The plurality of reference lines may consist of n lines located within a predetermined distance from the boundary of the current block. In this case, separate reference line information indicating at least one reference line used for intra prediction of the current block may be signaled. Specifically, the reference line information may include an index indicating any one of a plurality of reference lines. In addition, if at least some of the samples to be used as reference samples have not been restored, the intra prediction unit may obtain a reference sample by performing a reference sample padding process. In addition, the intra prediction unit may perform a reference sample filtering process to reduce errors in intra prediction. That is, filtered reference samples may be obtained by performing filtering on reference samples obtained by the neighboring samples and/or the reference sample padding process. The intra prediction unit predicts pixels of the current block using unfiltered reference samples or filtered reference samples. In the present disclosure, neighboring samples may include samples on at least one reference line. For example, neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). In some embodiments, the intra prediction mode set may consist of some of all intra prediction modes. Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, the preset angle range may be set differently according to the shape of the current block. For example, when the current block is a rectangular block, a wide angle mode indicating an angle greater than 45 degrees or less than −135 degrees in the clockwise direction may be additionally used. When the current block is a horizontal block, the angle mode may indicate an angle within an angle range (i.e., a second angle range) between (45+offset1) degrees and (−135+offset1) degrees clockwise. In this case, angle modes 67 to 76 outside the first angle range may be additionally used. Also, when the current block is a vertical block, the angle mode may indicate an angle within an angle range (i.e., a third angle range) between (45−offset2) degrees and (−135−offset2) degrees clockwise. In this case, angle modes −10 to −1 outside the first angle range may be additionally used. According to an embodiment of the present invention, the values of offset1 and offset2 may be determined differently according to the ratio between the width and height of the rectangular block. Also, offset1 and offset2 may be positive numbers.

According to a further embodiment of the present invention, the plurality of angle modes included in the intra prediction mode set may include a basic angle mode and an extended angle mode. In this case, the extended angle mode may be determined based on the basic angle mode.

According to an embodiment, the basic angle mode is a mode corresponding to an angle used in intra prediction of an existing High Efficiency Video Coding (HEVC) standard, and the extended angle mode may be a mode corresponding to a newly added angle in intra prediction of the next generation video codec standard. More specifically, the basic angle mode is an angle mode corresponding to any one of intra prediction modes {2, 4, 6, . . . , 66} and the extended angle mode is an angle mode corresponding to any one of intra prediction modes {3, 5, 7, . . . , 65}. That is, the extended angle mode may be an angle mode between basic angle modes within the first angle range. Accordingly, the angle indicated by the extended angle mode may be determined based on the angle indicated by the basic angle mode.

According to another embodiment, the basic angle mode may be a mode corresponding to an angle within a preset first angle range, and the extended angle mode may be a wide angle mode outside the first angle range. That is, the basic angle mode is an angle mode corresponding to any one of intra prediction modes {2, 3, 4, . . . , 66} and the extended angle mode is an angle mode corresponding to any one of intra prediction modes among {−10, −9, . . . , −1} and {67, 68, . . . , 76}. The angle indicated by the extended angle mode may be determined as an angle opposite to the angle indicated by the corresponding basic angle mode. Accordingly, the angle indicated by the extended angle mode may be determined based on the angle indicated by the basic angle mode. Meanwhile, the number of extended angle modes is not limited to this, and additional extension angles may be defined according to the size and/or shape of the current block. For example, the extended angle mode may be defined as an angle mode corresponding to any one of intra prediction modes {−14, −13, . . . , −1} and {67, 68, . . . , 80}. Meanwhile, the total number of intra prediction modes included in the intra prediction mode set may vary depending on the configuration of the basic angle mode and extended angle mode described above.

In the above embodiments, the interval between the extended angle modes can be set based on the interval between the corresponding basic angle modes. For example, the interval between extended angle modes {3, 5, 7, . . . , 65} may be determined based on the interval between corresponding basic angle modes {2, 4, 6, . . . , 66}. For example, the interval between extended angle modes {−10, −9, . . . , −1} may be determined based on the interval between corresponding opposite-side basic angle modes {56, 57, . . . , 65}, and the interval between extended angle modes {67, 68, . . . , 76} may be determined based on the interval between corresponding opposite-side basic angle modes {3, 4, . . . , 12}. The angle interval between the extended angle modes can be configured to be the same as the angle interval between the corresponding basic angle modes. Also, the number of extended angle modes in the intra prediction mode set may be configured to be less than or equal to the number of basic angle modes.

According to an embodiment of the present invention, the extended angle mode may be signaled based on the basic angle mode. For example, the wide angle mode (i.e., extended angle mode) may replace at least one angle mode (i.e., basic angle mode) within the first angle range. The basic angle mode to be replaced may be an angle mode corresponding to the opposite side of the wide angle mode. That is, the basic angle mode to be replaced is an angle mode corresponding to an angle in the opposite direction of the angle indicated by the wide angle mode or an angle different from the angle in the opposite direction by a preset offset index. According to an embodiment of the present invention, the preset offset index is 1. The intra prediction mode index corresponding to the replaced basic angle mode may be mapped back to the wide angle mode to signal the wide angle mode. For example, the wide angle mode {−10, −9, . . . , −1} may be signaled by an intra prediction mode index {57, 58, . . . , 66}, and the wide angle mode {67, 68, . . . , 76} may be signaled by an intra prediction mode index {2, 3, . . . , 11}.

Figure 7:
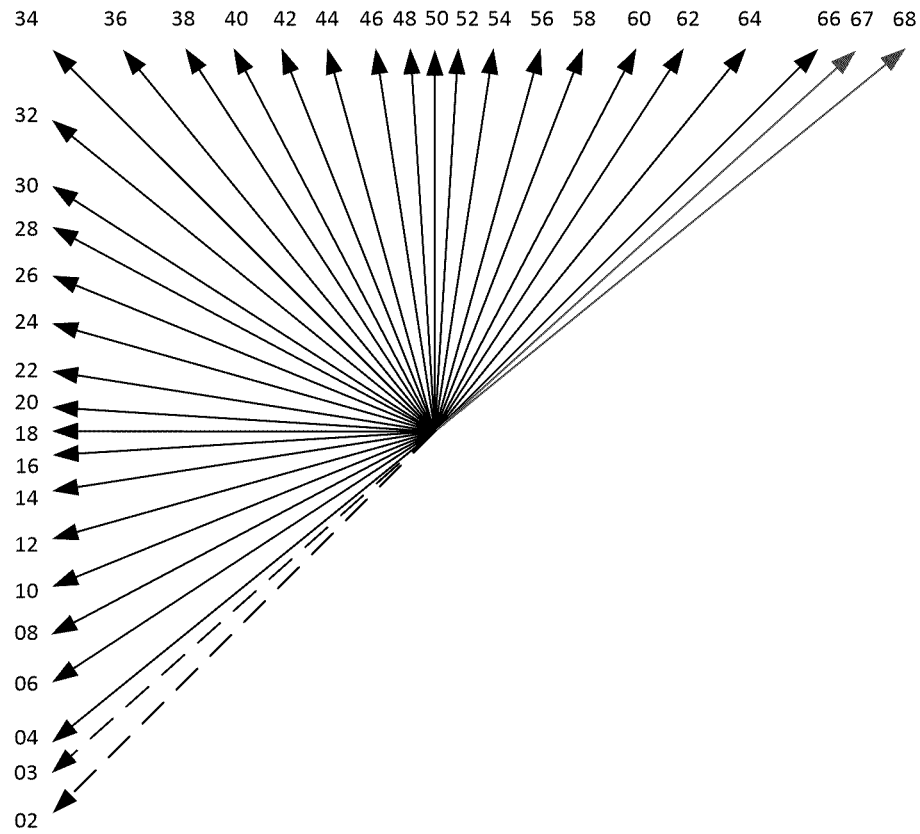
FIG. 7 is a diagram illustrating an embodiment of a method in which a wide-angular mode is signaled.

FIG. 7 is a diagram illustrating an embodiment of a method in which a wide-angular mode is signaled. Referring to FIG. 7, wide-angular modes 67 and 68 may replace basic angular modes 2 and 3. In addition, the wide-angular modes 67 and 68 may be signaled by intra prediction mode indexes 2 and 3, respectively. In this way, as the intra prediction mode index for the basic angle mode signals the extended angle mode, even if the configuration of angle modes used for intra prediction of each block is different, the same set of intra prediction mode indexes can be used for signaling of the intra prediction mode. Accordingly, signaling overhead due to changes in intra prediction mode configuration can be minimized.

Meanwhile, whether to use the extended angle mode may be determined based on at least one of the shape and size of the current block. According to an embodiment, when the size of the current block is larger than a preset size, the extended angle mode may be used for intra prediction of the current block, and otherwise, only the basic angle mode may be used for intra prediction of the current block. According to another embodiment, when the current block is a block other than a square, the extended angle mode can be used for intra prediction of the current block, and when the current block is a square block, only the basic angle mode can be used for intra prediction of the current block.

The intra prediction unit determines reference samples and/or interpolated reference samples to be used for intra prediction of the current block based on the intra prediction mode information of the current block. When the intra prediction mode index indicates a specific angular mode, a reference sample or an interpolated reference sample corresponding to the specific angle from the current sample of the current block is used for prediction of the current sample. Accordingly, different sets of reference samples and/or interpolated reference samples may be used for intra prediction according to the intra prediction mode. After intra prediction of the current block is performed using the reference samples and the intra prediction mode information, the decoder restores sample values of the current block by adding the residual signal of the current block obtained from the inverse transform unit to the intra prediction value of the current block.

Meanwhile, the encoder may signal the selected intra prediction mode information to the decoder. The decoder can extract intra prediction mode information of the current block from the bitstream. For example, when the total number of intra prediction modes constituting the intra prediction mode set is T (e.g., 67), since each mode does not consider the probability of selection and the context of the corresponding block and neighboring blocks, the method of signaling by expressing T modes simply in binary is inefficient. Therefore, an intra prediction mode set consisting of some modes associated with the current block among all modes may be separately managed. If the range of the intra prediction mode signaled is reduced, efficient signaling can be performed. For example, efficient signaling can be performed by separately managing a list of some modes that are most likely to be used in a current block among all modes.

As described above, the angle range of the angular mode used for intra prediction may be configured differently according to the shape of the current block. For example, when the current block is a rectangular block, a wide-angular mode indicating an angle greater than 45 degrees or less than −135 degrees in the clockwise direction may be additionally used.

Figure 8:
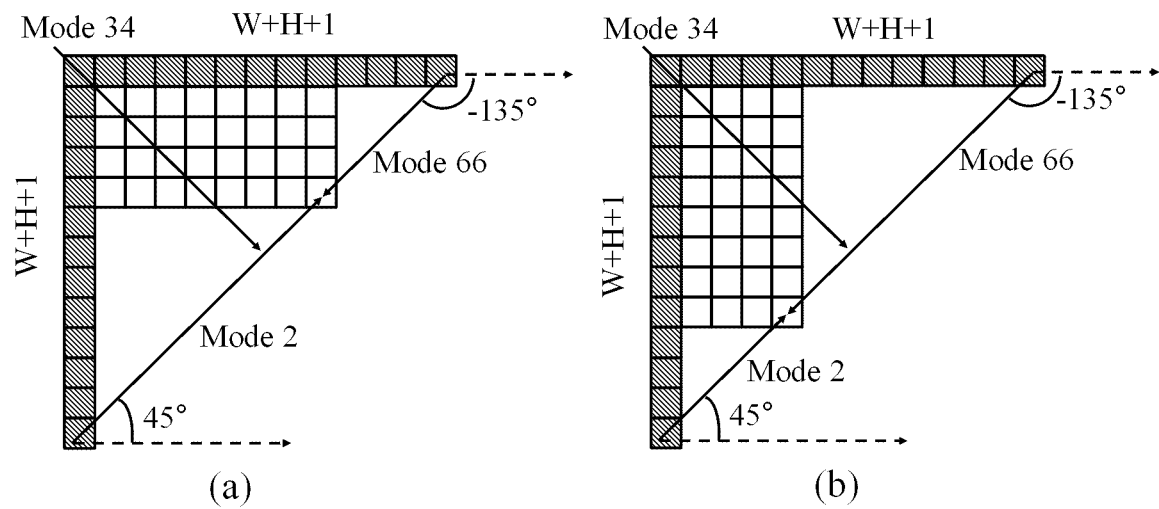
FIG. 8 is a diagram illustrating an embodiment of a horizontally rectangular block and a vertically rectangular block.

FIG. 8 is a diagram illustrating an embodiment of a horizontally rectangular block and a vertically rectangular block. FIG. 8(*a*) shows a positional relationship between a reference sample and a current sample according to an intra prediction mode when the current block is a horizontally rectangular block having a width greater than a height. FIG. 8(*b*) shows a positional relationship between a reference sample and a current sample according to an intra prediction mode when the current block is a vertically rectangular block having a height greater than a width. In FIG. 8, when the wide-angular mode is not used, Width(W)+Height(H)+1 reference samples may be used for each of the upper reference line and the left reference line of the current block.

Figure 9:
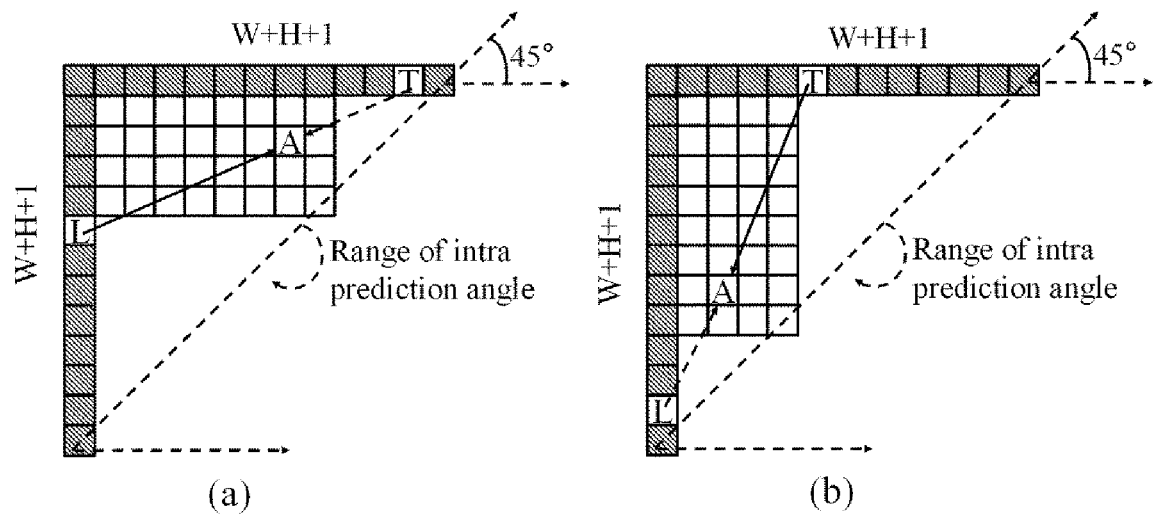
FIG. 9 is a diagram illustrating an embodiment of a positional relationship between a current sample and a reference sample of the current block when the current block has a rectangular shape.

FIG. 9 is a diagram illustrating an embodiment of a positional relationship between a current sample and a reference sample of the current block when the current block has a rectangular shape. According to an embodiment, when the current block is a rectangular block, a method using the wide-angular mode instead of the basic angular mode may be advantageous. This is because prediction performance may be improved when a current sample is predicted using a reference sample relatively close to the current sample. In a rectangular block, the reference sample corresponding to the prediction direction indicated by the wide-angular mode may be closer to the current sample than the reference sample corresponding to the opposite direction.

Specifically, referring to FIG. 9(*a*), when the current block is a horizontally rectangular block, the current sample A is closer to the upper reference sample T than the left reference sample L. The direction in which the current sample A is predicted from the upper reference sample T may be a wide-angular mode exceeding 45 degrees in the clockwise direction. Also, referring to FIG. 9(*b*), when the current block is a vertically rectangular block, the current sample A is closer to the left reference sample L than the upper reference sample T. The direction in which the current sample A is predicted from the left sample L may be a wide-angular mode of less than −135 degrees in the clockwise direction. In addition, when predicting the current block based on the wide-angular mode, unlike FIG. 8, the upper 2W+1 reference samples and the left 2H+1 reference samples may be used.

Figure 10:
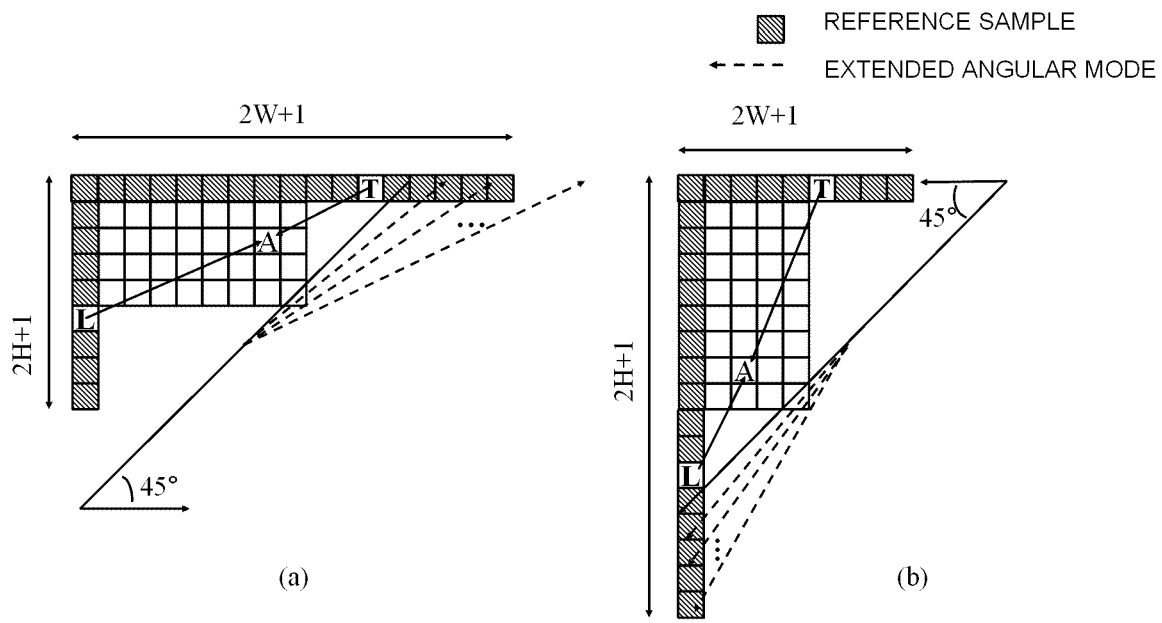
FIG. 10 is a diagram illustrating an embodiment of a wide-angular mode.

FIG. 10 is a diagram illustrating an embodiment of a wide-angular mode. The dotted arrow in FIG. 10 indicates angles indicated by the wide-angular modes of the rectangular block. Referring to FIG. 10(*a*), the current block has a width to height ratio of 2:1, and the shape of the current block is a horizontal rectangle. In this case, the current block may be predicted using wide-angular modes with an angle range exceeding 45 degrees in the clockwise direction. Referring to FIG. 10(*b*), the current block has a width to height ratio of 1:2, and the shape of the current block is a vertical rectangle. In this case, the current block may be predicted using wide-angular modes of less than −135 degrees in the clockwise direction.

According to an embodiment of the present invention, the number of wide-angular modes may be determined according to the shape of the current block. Also, basic angular modes that are replaced with wide-angular modes may be determined based on the number of wide-angular modes. In this case, each of the intra prediction mode indexes indicating basic angular modes to be replaced may indicate each of the mapped wide-angular modes. For example, the decoder may interpret the intra prediction mode index of the current block differently according to the ratio of the current block. In addition, the decoder may perform intra prediction on the current block based on the interpreted intra prediction mode. Hereinafter, an intra prediction mode index indicating the number of wide-angular modes and the wide-angular mode according to the shape of the current block will be described with reference to FIG. 11.

Figures 11, 12:
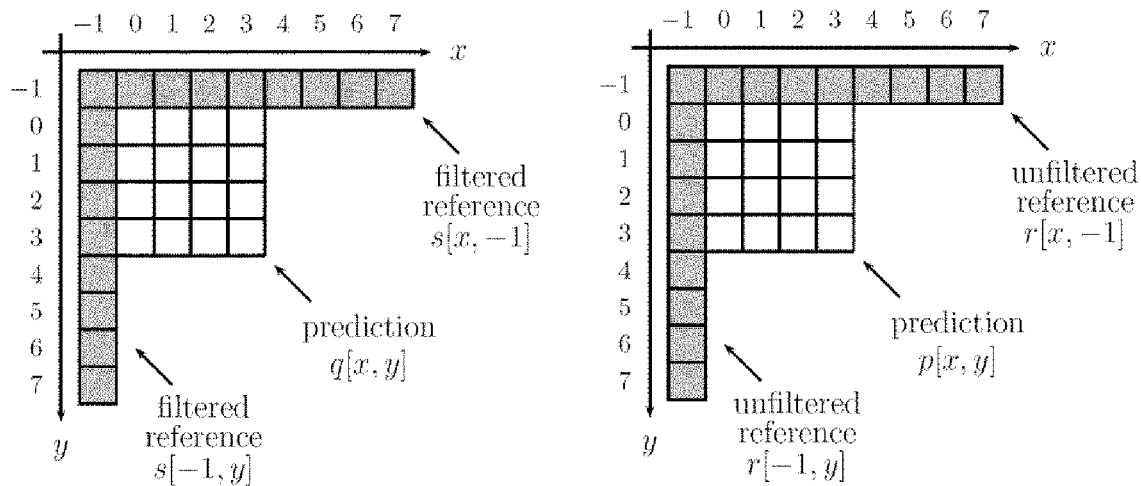
FIG. 11 is a diagram illustrating an embodiment of the number of wide-angular modes according to the shape of a current block.
FIG. 12 is a diagram illustrating an embodiment of a method of generating a final predicted sample of a current sample included in a current block using PDPC.

FIG. 11 is a diagram illustrating an embodiment of the number of wide-angular modes according to the shape of a current block. According to an embodiment, the shape of the current block may be defined based on the width and height of the current block. For example, the shape of the current block may be determined based on the ratio (W/H) of the width and height of the current block. In the present disclosure, the width and height of the current block may be the width and height of the conversion unit, but are not limited thereto. For example, the width and height of the current block may be the width and height of the coding unit or prediction unit. According to an embodiment, when the ratio (W/H) is 1, the shape of the current block is square, and the wide-angular mode may not be used. In this case, the intra prediction mode indexes between 2 and 66 may indicate angular modes within the basic angle range.

According to an embodiment, when the ratio (W/H) is greater than or equal to 2, the shape of the current block may be a horizontal rectangle, and the number of wide-angular modes may be at least six. When the ratio (W/H) is 2, each of indexes 2, 3, 4, 5, 6, and 7 from 2, which is the smallest index, to 7, among intra prediction mode indexes indicating the angular mode may indicate wide-angular modes of the angle range exceeding 45 degrees in the clockwise signal. Also, when the ratio (W/H) exceeds 2, each of the indexes from 2, which is the smallest index, to (M+1) may indicate wide-angular modes in a range exceeding 45 degrees in the clockwise direction. In this case, M may be the number of wide-angular modes determined according to the ratio (W/H). Also, the number of wide-angular modes may be up to 14.

According to an embodiment, when the ratio (W/H) is less than or equal to ½, the shape of the current block may be a vertical rectangle, and the number of wide-angular modes may be at least six. When the ratio (W/H) is ½, indexes {61, 62, 63, 64, 65, 66} from 61 to 66, which is the largest index among the intra prediction mode indexes indicating the angular mode, may indicate wide-angular modes with an angle range of less than −135 degrees in a clockwise direction. In addition, when the ratio (W/H) is less than ½, each of the indexes from 66, which is the smallest index 66, to (67-M) may indicate wide-angular modes of an angle range of less than −135 degrees in a clockwise direction. In this case, M may be the number of wide-angular modes determined according to the ratio (W/H).

Meanwhile, when the prediction block of the current block is generated by using the reference samples of the current block in the intra prediction unit, discontinuity may occur at a boundary between the prediction block and the reference samples. As a result, subjective image quality may deteriorate and encoding efficiency may deteriorate. Accordingly, boundary filtering may be performed on the boundary portion of the prediction block generated using the reference samples. The discontinuity between the prediction block and the reference samples can be alleviated through boundary filtering.

Or, in order to alleviate discontinuity, a position dependent intra prediction combination (hereinafter referred to as "PDPC") may be applied to a prediction block of a current block. For example, a final prediction sample may be generated by combining the intermediate prediction sample before the boundary filtering described above and at least one reference value corresponding to the current sample of the current block. In this case, the reference value may be a value obtained from an unfiltered sample value of at least one reference sample corresponding to the current sample among the reference samples. Also, at least one reference sample corresponding to the current sample may be determined based on the position of the current sample. Here, the position of the current sample indicates a relative position based on the sample positioned at the top left of the current block. PDPC may be referred to as position dependent intra prediction sample filtering. Through this, the encoder and the decoder may generate a final prediction block with reduced discontinuity between the prediction block and the reference samples without performing separate boundary filtering on the boundary of the prediction block. Hereinafter, the reference sample refers to an unfiltered reference sample unless otherwise specified, and the reference sample value may mean an unfiltered sample value.

Hereinafter, a method of generating a final prediction block using PDPC will be described with reference to FIGS. 12 to 15. FIG. 12 is a diagram illustrating an embodiment of a method of generating a final prediction sample of a current sample included in a current block using PDPC. Referring to FIG. 12, a first prediction sample q, which is an intermediate prediction sample of the current sample, may be generated based on the intra prediction mode for the current block. The encoder and decoder may generate the first prediction sample of the current block based on the intra prediction mode of the current block as described above with reference to FIGS. 5 to 7.

Next, a second prediction sample p, which is the final prediction sample of the current sample, may be generated based on the sample value (q[x, y]) of the first prediction sample and at least one reference value. The encoder and decoder may determine a value (p[x, y]) of the second prediction sample based on the sample value (q[x, y]) of the first prediction sample and at least one reference value. In this case, the reference value may be a value obtained based on an unfiltered sample value of at least one reference sample corresponding to the current sample. For example, the at least one reference value may include at least one of a left reference value, an upper reference value, or an upper left reference value. Here, the left reference value may be a value obtained based on at least one left reference sample corresponding to the current sample among the left reference samples of the current block. Also, the upper reference value may be a value obtained based on at least one upper reference sample corresponding to the current sample among upper reference samples of the current block. Also, the upper left reference value may be a sample value of the upper left reference sample of the current block.

According to an embodiment, at least one reference sample corresponding to the current sample may be determined based on at least one of the shape of the current block, the intra prediction mode index of the current block, or the intra prediction mode of the current block. For example, the encoder and decoder may determine at least one reference sample corresponding to the current sample based on the intra prediction mode of the current block. Also, the position of at least one reference sample corresponding to each of the samples included in one block may vary according to the position (x, y) of each sample. Also, a method of obtaining a reference value from a reference sample may vary according to at least one of a shape of a current block, an intra prediction mode index of the current block, or an intra prediction mode of the current block. The method of determining the reference sample corresponding to the current sample and the method of obtaining the reference value will be described in detail with reference to FIGS. 13 to 15.

According to an embodiment, the encoder and the decoder may linearly combine the sample value (q[x, y]) of the first prediction sample and at least one reference value corresponding to the current sample to generate the second prediction sample p. For example, the value (q[x, y]) of the first prediction sample and the at least one reference value may be linearly combined based on a set of PDPC parameters including one or more PDPC parameters. For convenience of description, hereinafter, a linear combination between a value (q[x, y]) of the first prediction sample and at least one reference value may be referred to as a PDPC linear combination. The PDPC parameter set may include parameters applied to each of the at least one reference value. Specifically, the PDPC parameter set may be configured with parameters applied to each of the left reference value, the upper reference value, and the upper left reference value. In addition, in linearly combining the sample value of the first prediction sample and the at least one reference value, a weight applied to the sample value of the first prediction sample may be determined based on parameters included in the PDPC parameter set.

According to an embodiment, each of the PDPC parameters may be a value that changes according to the position of the current sample. For example, the first parameter applied to the left reference value may be configured such that the position of the current sample becomes smaller as the position of the current sample is farther from the left boundary of the current block. Also, the second parameter applied to the upper reference value may be configured such that the position of the current sample becomes smaller as the position of the current sample farther from the upper boundary of the current block. Also, the third parameter applied to the upper left reference value may be configured such that the position of the current sample becomes smaller as the position of the current sample farther from the upper left sample of the current block. In this case, the weight applied to the sample value of the first prediction sample may be configured such that the position of the current sample becomes larger as the position of the current sample farther from the left or upper boundary. For example, the weight applied to the sample value of the first prediction sample may be determined based on a value obtained by subtracting the first parameter and the second parameter from a previously configured offset. The parameters included in the PDPC parameter set may be obtained through addition and shift operations.

According to an embodiment of the present invention, the PDPC parameter set may be configured differently according to the intra prediction mode. For example, a final prediction sample may be generated according to the intra prediction mode of the current block, based on a part of the left reference value, the upper reference value, and the upper left reference value. In this case, parameters applied to unused reference values may be configured with pre-configured values. The pre-configured value may be 0. Also, according to an embodiment of the present invention, the PDPC parameter set corresponding to specific intra mode indexes may be configured differently according to the shape of the current block. In relation to this, it will be described in detail with reference to FIGS. 17 to 21.

When the PDPC linear combining method according to an embodiment is represented by Equation, it is as shown in [Equation 1] below. In [Equation 1], pred' (x, y) represents the sample value of the second prediction sample, and pred(x, y) represents the sample value of the first prediction sample. In addition, RL[x][y] represents a left reference value corresponding to the position (x, y) of the current sample of the current block. In addition, RT[x][y] represents an upper reference value corresponding to the position (x, y) of the current sample of the current block. R[−1][−1] represents the sample value of the upper left reference sample of the current block. In addition, wL, wT and wTL represent parameters applied to the left reference value, the upper reference value, and the upper left reference value, respectively.

$$\text{pred}'(x,y)=(wL \times RL[x][y]+wT \times RT[x][y]-wTL \times R[-1][-1]+(64-wL-wT+wTL) \times \text{pred}(x,y)+32) >> 6 \quad \text{[Equation 1]}$$

When the final prediction block is generated through PDPC linear combining, additional filtering such as boundary filtering that was performed on prediction blocks predicted based on DC mode in the HEVC standard, or edge filtering that was performed on the predicted block predicted based on the horizontal/vertical mode may not be performed.

According to an embodiment of the present invention, PDPC may be applied to some prediction modes among all intra prediction modes constituting the intra prediction mode set. For example, the PDPC may be used to generate a final prediction block when the prediction mode of the current block is any of DC mode, plane mode, or some angular modes to which the PDPC is applied. For example, some angular modes to which PDPC is applied may include a horizontal mode, a vertical mode, a vertical diagonal mode, and a horizontal diagonal mode shown through FIG. 6. Also, some angular modes to which the PDPC is applied may include horizontal diagonal neighboring modes around the horizontal diagonal mode and vertical diagonal neighboring modes around the vertical diagonal mode.

According to an embodiment, the horizontal diagonal neighboring mode set may be configured as horizontal diagonal neighboring modes in the first PDPC angle range based on the prediction direction indicated by the horizontal diagonal mode. The horizontal diagonal neighboring modes may be some angular modes between the horizontal diagonal mode and the horizontal mode. Also, the first PDPC angle range may be between a horizontal diagonal mode and a first angular mode. In this case, the first angular mode may be any one of angular modes between the horizontal diagonal mode and the horizontal mode. When the intra prediction mode of the current block is a horizontal diagonal neighboring mode, an intermediate prediction sample may be generated using only the left reference sample around the left boundary based on the boundary of the current block.

In addition, the vertical diagonal neighboring mode set may be configured as vertical diagonal neighboring modes in the second PDPC angle range based on the prediction direction indicated by the vertical diagonal mode. The vertical diagonal neighboring modes may be some angular modes between the vertical mode and the vertical diagonal mode. Also, the second PDPC angle range may be between a vertical diagonal mode and a second angular mode. In this case, the second angular mode may be any one of angular modes between the vertical mode and the vertical diagonal mode. When the intra prediction mode of the current block is a vertical diagonal neighboring mode, an intermediate prediction sample may be generated using only the upper reference sample around the upper boundary based on the boundary of the current block.

Meanwhile, the reference value and PDPC parameter set used to perform PDPC linear combining may be differently determined according to the intra prediction mode of the current block. Hereinafter, a method in which PDPC is applied according to the intra prediction mode of the current block will be described in detail with reference to FIGS. 13 to 15.

Figure 13:
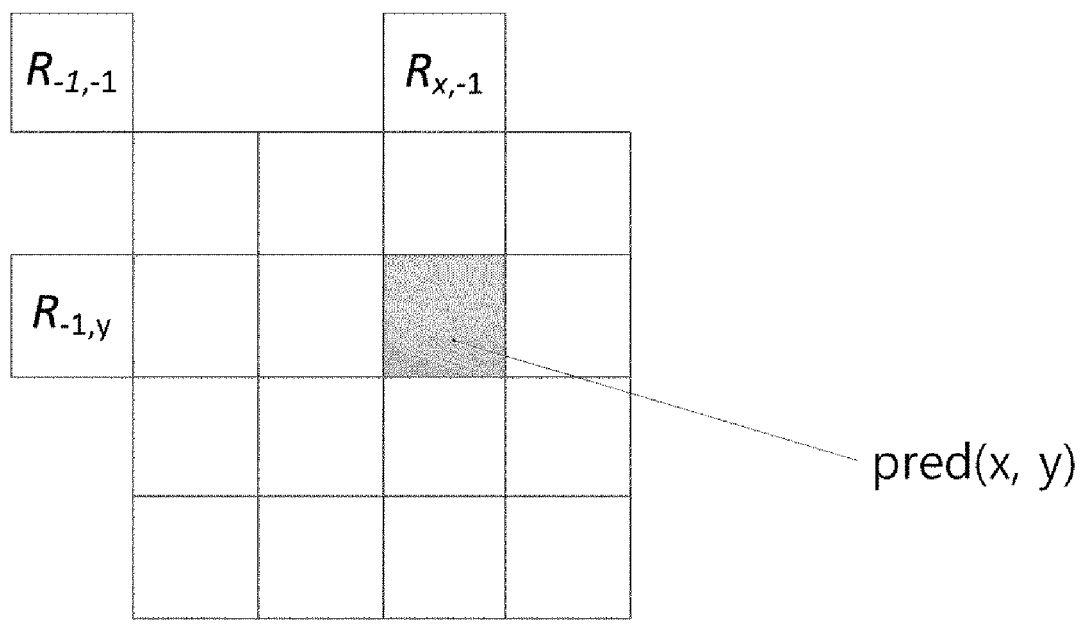
FIG. 13 is a diagram illustrating an embodiment of a method in which PDPC is applied when the intra prediction mode of the current block is any of DC mode, plane mode, vertical mode, and horizontal mode.

FIG. 13 is a diagram illustrating an embodiment of a method in which PDPC is applied when the intra prediction mode of the current block is any of DC mode, plane mode, vertical mode, and horizontal mode. According to an embodiment, when the intra prediction mode of the current block is any one of DC mode, plane mode, vertical mode, and horizontal mode, at least one reference sample corresponding to the current sample (x, y) may include a first reference sample positioned on the same line as the current sample among the left reference samples of the current block. In this case, the left reference value may be a sample value (R[−1][y]) of the first reference sample. Also, at least one reference sample corresponding to the current sample may include a second reference sample positioned on the same line as the current sample among the upper reference samples of the current block. In this case, the upper reference value may be a sample value (R[x][−1]) of the second reference sample. Also, at least one reference sample corresponding to the current sample may include a reference sample on the upper left side of the current sample. In this case, the upper left reference value may be a sample value (R[−1][−1]) of the upper left reference sample.

According to an embodiment, when the intra prediction mode of the current block is the DC mode, the first parameter wL applied to the left reference value, the second parameter wT applied to the upper reference value, and the third parameter wTL applied to the upper left reference value may be determined as in [Equation 2]. In addition, when the intra prediction mode of the current block is one of a plane mode, a vertical mode, and a horizontal mode, the first parameter wL and the second parameter wT are equal to [Equation 2], and the third parameter wTL may be set to 0.

$wT[y]=32>>((y<<1)>>\text{shift})$, $wL[x]=32>>((x<<1)>>\text{shift})$, $wTL[x][y]=(wL[x]>>4)+(wT[y]>>4)$, [Equation 2]

Here, shift=(log 2(width)−2+log 2(height)−2+2)>>2, width is the width of the current block, and height is the height of the current block.

Figure 14:
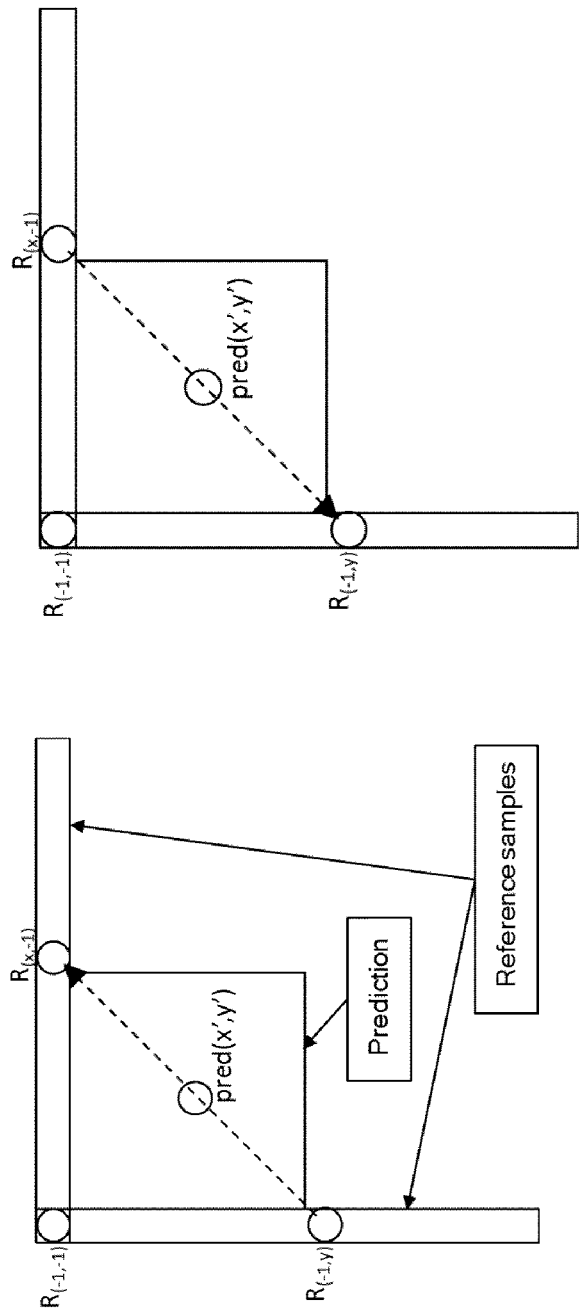
FIG. 14 is a diagram illustrating an embodiment of a method in which PDPC is applied when the intra prediction mode of a current block is a horizontal diagonal mode or a vertical diagonal mode.

FIG. 14 is a diagram illustrating an embodiment of a method in which PDPC is applied when the intra prediction mode of a current block is a horizontal diagonal mode or a vertical diagonal mode. According to an embodiment, when the intra prediction mode of the current block is one of a horizontal diagonal mode and a vertical diagonal mode, at least one reference sample corresponding to the current sample may include a first reference sample at a position where the diagonal direction and the left reference line intersect based on the position(x', y') of the current sample. The position of the first reference sample may be (−1, x'+y'+1). In this case, the left reference value may be a sample value (R[−1][x'+y'+1]) of the first reference sample. Further, at least one reference sample corresponding to the current sample may include a second reference sample at a position where the diagonal direction and the upper reference line intersect based on the position (x', y') of the current sample. The position of the second reference sample may be (x'+y'+1, −1). In this case, the upper reference value may be a sample value (R[x'+y'+1][−1]) of the second reference sample. In addition, when the intra prediction mode of the current block is one of the horizontal diagonal mode and the vertical diagonal mode, the upper left reference sample of the current block may not be used to generate the final prediction block.

According to an embodiment, when the intra prediction mode of the current block is one of a horizontal diagonal mode and a vertical diagonal mode, the first parameter wL applied to the left reference value, the second parameter wT applied to the upper reference value, and the third parameter wTL applied to the upper left reference value may be determined as in [Equation 3].

$wT[y]=16>>((y<<1)>>\text{shift})$, $wL[x]=16>>((x<<1)>>\text{shift})$, $wTL[x][y]=0$ [Equation 3]

Here, shift=(log 2(width)−2+log 2(height)−2+2)>>2, width is the width of the current block, and height is the height of the current block.

Figure 15:
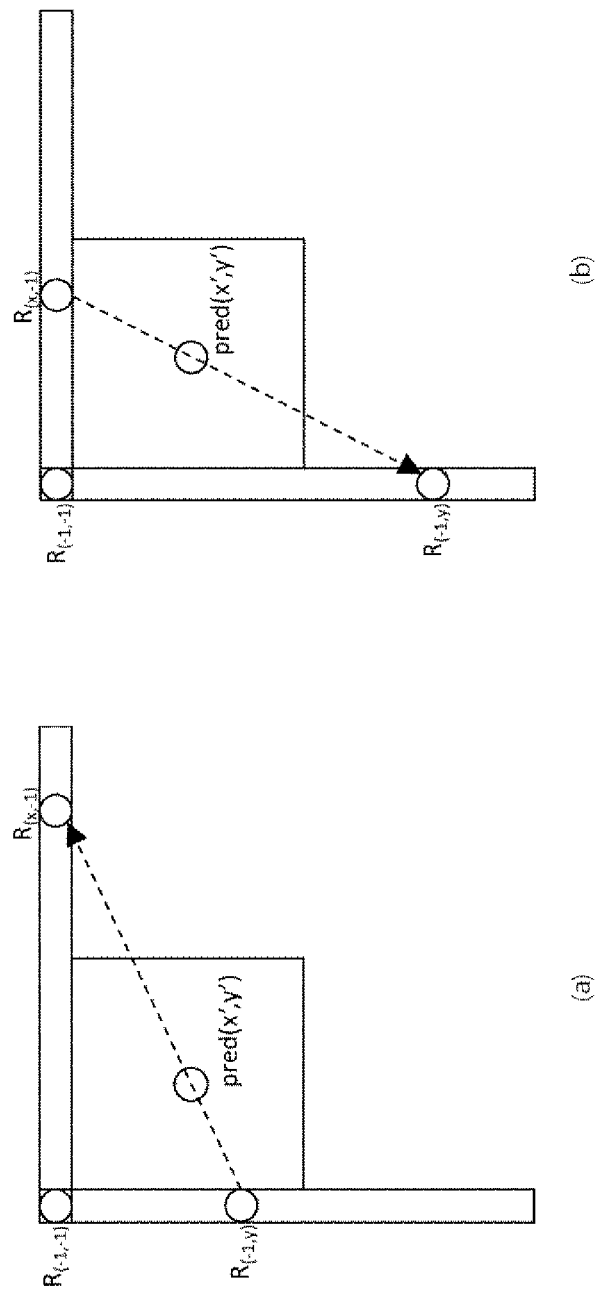
FIG. 15 is a diagram illustrating an embodiment of a method in which PDPC is applied when the intra prediction mode of a current block is one of horizontal diagonal neighboring modes and vertical diagonal neighboring modes.

FIG. 15 is a diagram illustrating an embodiment of a method in which PDPC is applied when the intra prediction mode of a current block is one of horizontal diagonal neighboring modes and vertical diagonal neighboring modes. According to an embodiment, when the intra prediction mode of the current block is one of horizontal diagonal neighboring modes and vertical diagonal neighboring modes, at least one reference value may be obtained based on at least one reference sample corresponding to an angle in a direction opposite to a prediction direction indicated by the intra prediction mode of the current block.

Referring to FIG. 15(a), when the intra prediction mode of the current block is one of horizontal diagonal neighboring modes, the decoder may determine at least one reference sample corresponding to the current sample from the upper reference samples. The decoder may determine the first position (x, −1) in which the intra prediction direction of the current block and the upper reference line intersect each other based on the position (x', y') of the current sample. In this case, the upper reference line may be a reference line determined based on reference line information among a plurality of reference lines. Also, the decoder may determine at least one reference sample corresponding to the first position among the upper reference samples included in the upper reference line. According to an embodiment, when the first position is a position in an integer sample unit, the decoder may obtain a reference value corresponding to the current sample based on the sample value of the reference sample in the first position. For example, the reference value corresponding to the current sample may be the sample value of the reference sample in the first position.

The first position may not correspond to the position of an integer sample unit according to the current sample position. The first position may be a position between two adjacent integer samples. That is, the first position may be represented by a combination of iIdx indicating the position of the integer sample unit and iFact indicating the position of the subpel unit between two adjacent integer samples. In this case, position iIdx in the unit of integer samples may represent a smaller index among two adjacent integer samples. In addition, iFact may represent positions 0 to N−1 in 1/N units obtained through equal N division between two adjacent integer samples. In this case, N may be an even number. According to an embodiment of the present invention, N may be 32 or 64. Specifically, when the current sample position is (x, y), iIdx=(((x or y)+1)*intraPredAngle)>>5, and iFact=((x or y)+1)*intraPredAngle)&31. Here, >> may mean a right shift operation, & may mean a modulo operation. In addition, intraPredAngle takes a tangent function for the prediction direction angle of the intra prediction mode and may be a value of 32 or 64 times. According to an embodiment, when the first position is between different adjacent first and second reference samples, the decoder may obtain a reference value corresponding to the first position based on the positional relationship between the first position, the first reference sample, and the second reference sample.

For example, the decoder may interpolate the sample values of each of the first reference sample and the second reference sample to generate a reference value corresponding to the current sample. For example, the decoder may perform interpolation of sample values of each of the first reference sample and the second reference sample based on the first distance between the first position and the first reference sample and the second distance between the first position and the second reference sample. In this case, the first distance and the second distance may be values in 1/N units determined based on iFact. For example, when the index of the first reference sample is smaller than the index of the second reference sample and the iFact of the first position is iFact_1, the first distance may be iFact_1 and the second distance may be (N-iFact_1). As described above, when N is even, it is difficult for a case where the first distance and the second distance are the same to occur. The first weight applied to the sample value of the first reference sample may be determined based on the first distance. The second weight applied to the sample value of the second reference sample may be determined based on the second distance. In this case, the first weight and the second weight may be configured to have a larger value as they approach the first position. Also, the sum of the first weight and the second weight may be a pre-configured value. In this case, the pre-configured value may be 64. Also, the decoder may generate a reference value corresponding to the current sample based on the first weight, the second weight, and sample values of each of the first reference sample and the second reference sample.

According to another embodiment, even when the first position is between adjacent first and second reference samples which are different from each other, the decoder may obtain a reference value using only the iIdx of the first position. In this case, the decoder may determine one of the sample values of the first reference sample and the sample values of the second reference sample to be used as the reference value based on the first position. For example, the decoder may determine the reference sample closest to the first position among the first reference sample and the second reference sample based on the above-mentioned first distance and second distance. In this case, the decoder may obtain a reference value corresponding to the current sample based on the sample value of the reference sample closest to the first position. For example, the reference value of the current sample may be the sample value of the reference sample corresponding to the shorter distance among the first and second distances described above.

According to an embodiment, when the intra prediction mode of the current block is one of horizontal diagonal neighboring modes, at least one reference value corresponding to the current sample may not include a left reference value and an upper left reference value. In this case, the first parameter wL applied to the left reference value and the third parameter wTL applied to the upper left reference value may be configured as 0. In addition, the second parameter wT applied to the upper reference value may be configured as shown in [Equation 4].

$wT[y]=32>>((y<<1)>>\text{shift}),$ $wL[x]=0,$ $wTL[x][y]=0,$ [Equation 4]

Here, shift=(log 2(width)−2+log 2(height)−2+2)>>2, width is the width of the current block, and height is the height of the current block.

Referring to FIG. 15(b), when the intra prediction mode of the current block is one of vertical diagonal neighboring modes, the decoder may determine at least one reference sample corresponding to the current sample from the left samples. The decoder may determine the second position (−1, y) in which the intra prediction direction of the current block and the left reference line intersect each other based on the position (x', y') of the current sample. In this case, the left reference line may be a reference line determined based on reference line information among a plurality of reference lines. Also, the decoder may determine at least one reference sample corresponding to the second position among the left reference samples included in the left reference line. In addition, the decoder may obtain a reference value corresponding to the current sample in the same or corresponding method as described with reference to FIG. 10(a).

According to an embodiment, when the intra prediction mode of the current block is one of vertical diagonal neighboring modes, at least one reference value corresponding to the current sample may not include an upper reference value and an upper left reference value. In this case, the second parameter wT applied to the upper reference value and the third parameter wTL applied to the upper left reference value may be configured as 0. In addition, the first parameter wL applied to the left reference value may be configured as shown in [Equation 5].

$wL[x]=32>>((x<<1)>>\text{shift}),$ $wT[y]=0,$ $wTL[x][y]=0,$ [Equation 5]

Here, shift=(log 2(width)−2+log 2(height)−2+2)>>2, width is the width of the current block, and height is the height of the current block.

According to an additional embodiment of the present invention, when the intra prediction mode of the current block is the above-described wide-angular mode, the decoder may determine whether to use PDPC based on the indicator received from the encoder. This is because prediction performance may be improved when a final prediction block of a current block is generated by applying PDPC to a wide-angular mode.

According to an embodiment, the encoder may signal an indicator indicating whether PDPC is applied to wide-angular modes. When the intra prediction mode of the current block is wide-angular mode, the decoder may determine whether to apply PDPC based on an indicator indicating whether PDPC is applied to wide-angular modes. For example, an indicator indicating whether PDPC is applied to wide-angular modes may be signaled through a higher level set of RBSPs. Here, the higher level set of RBSPs may be either a picture parameter set (PPS) or a sequence parameter set (SPS), or a video parameter set (VPS) as described above. In addition, an indicator indicating whether PDPC is applied to wide-angular modes may be signaled in each unit of at least one of a slice/tile, a CTU, or a CU.

According to another embodiment, the encoder may signal a second indicator pdpc_wide_angle_flag indicating whether PDPC is applied to wide-angular modes separately from a first indicator pdpc_sps_flag indicating whether PDPC is applied during intra prediction. In this case, the decoder may independently interpret the first indicator and the second indicator. For example, when the first indicator is deactivated and the second indicator is activated, the decoder may apply PDPC only for wide-angular modes. Conversely, when the first indicator is activated and the second indicator is deactivated, the decoder may apply PDPC to pre-configured modes except wide-angular modes.

Figure 16:
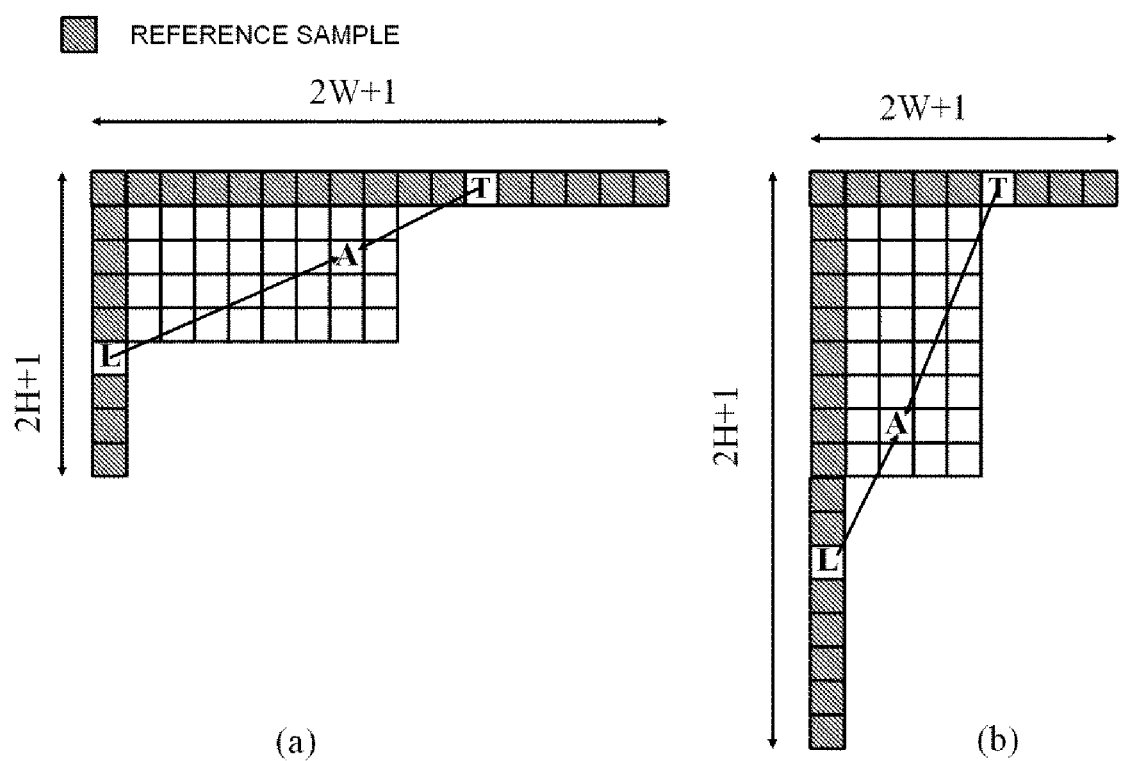
FIG. 16 is a diagram illustrating an embodiment of a method in which PDPC is applied when the current block is a rectangular block.

FIG. 16 is a diagram illustrating an embodiment of a method in which PDPC is applied when the current block is a rectangular block. According to an embodiment of the present invention, when the intra prediction mode of the current block is a wide-angular mode, at least one reference value corresponding to the current sample may be obtained based on a prediction direction indicated by the corresponding wide-angular mode. For example, the wide-angular modes are divided into upper wide-angular modes (FIG. 16(a)) referencing the upper reference sample and left wide-angular modes (FIG. 16(b)) referencing the left reference sample according to the prediction direction.

According to an embodiment, when the intra prediction mode of the current block is the upper wide-angular mode, a reference value may be obtained by using the same or corresponding method as the method (FIG. 15(b)) used when the intra prediction mode of the current block is the vertical diagonal neighboring mode. For example, the decoder may determine the position L in which the intra prediction direction of the current block and the left reference line intersect each other based on the position of the current sample A. In this case, the left reference line may be a reference line determined based on reference line information among a plurality of reference lines. The decoder may obtain a left reference value based on at least one reference sample corresponding to position L. Also, the decoder may linearly combine the intermediate prediction sample and the left reference value to generate a final prediction sample.

According to another embodiment, when the intra prediction mode of the current block is the left wide-angular mode, a reference value may be obtained by using the same or corresponding method as the method (FIG. 15(a)) used when the intra prediction mode of the current block is the horizontal diagonal neighboring mode. For example, the decoder may determine, based on the position of the current sample A, the position L in which the intra prediction direction of the current block and the upper reference line intersect each other. In this case, the upper reference line may be a reference line determined based on reference line information among a plurality of reference lines. The decoder may obtain an upper reference value based on at least one reference sample corresponding to position L. Also, the decoder may linearly combine the intermediate prediction sample and the upper reference value to generate a final prediction sample. In FIG. 16, the position L is illustrated as a position in an integer sample unit, but may also be a position in a subpel unit.

As described above, even when the intra prediction mode of the current block is a wide-angular mode, a final prediction block may be generated by applying PDPC. According to an embodiment, the intra prediction mode set may include a wide-angular mode. In this case, some of the intra prediction mode indexes may indicate different intra prediction modes according to the shape of the current block. For example, when the current block is a square block or a vertically rectangular block, the specific index indicates the vertical diagonal mode, and if the current block is a horizontally rectangular block, the specific index may indicate any one of wide-angular modes with an angle exceeding 45 degrees in a clockwise direction. Hereinafter, a method of generating a final prediction block by applying PDPC when the intra prediction mode set includes a wide-angular mode will be described.

According to an embodiment of the present invention, the intra prediction mode for the current block may be indicated through any one of the intra prediction mode indexes included in a specific index set. Here, each of the at least one intra prediction mode index included in the specific index set may be mapped to a plurality of angular modes indicating different directions. In this case, the intra prediction mode for the current block may be a specific angular mode according to the shape of the current block among a plurality of angular modes mapped to the intra prediction mode index. The decoder may obtain at least one reference value corresponding to the current sample through the method described above through FIGS. 12 to 16 based on a specific angular mode. Also, the decoder may generate a final prediction sample using the obtained at least one reference value.

According to an embodiment, the specific index set may be a first index set composed of intra prediction mode indexes that are larger than the smallest index and equal to or less than the pre-configured first index among the intra prediction mode indexes indicating the angular mode. The smallest index among intra prediction mode indexes indicating the angular mode may be 2. In addition, the first index may be a value configured based on the number of pre-configured wide-angular modes when the longer side is twice the shorter side among the width and height of the current block. For example, when the number of pre-configured wide-angular modes is N, the first index may be the N-th index (2+N−1) in ascending order from index 2. According to an embodiment of the present invention, the number of pre-configured wide-angular modes is 6, and the first index may be 7.

According to an embodiment, the specific index set may be a second index set composed of intra prediction mode indexes that are smaller than the largest index and greater than or equal to the pre-configured second index among the intra prediction mode indexes indicating the angular mode. The largest index among intra prediction mode indexes indicating the angular mode may be 66. In addition, the second index may be a value configured based on the number of pre-configured wide-angular modes when the longer side is twice the shorter side among the width and height of the current block. For example, when the number of pre-configured wide-angular modes is N, the second index may be the N-th index (66−N+1) in descending order from index 66. According to an embodiment of the present invention, the number of pre-configured wide-angular modes is 6, and the second index may be 61.

According to an embodiment, the specific index set may be a third index set composed of the smallest index among the intra prediction mode indexes indicating the angular mode. Also, a specific index set may be a fourth index set composed of the smallest index among intra prediction mode indexes indicating the angular mode.

In addition, the decoder may perform the above-described PDPC linear combining based on the PDPC parameter set corresponding to a specific index set. The decoder may generate a final prediction sample of the current block through PDPC linear combining. According to an embodiment of the present invention, PDPC parameter sets corresponding to a specific index set may be different from each other according to the shape of the current block. Hereinafter, a PDPC parameter set corresponding to each index set will be described with reference to FIGS. 17 to 20.

According to an embodiment, when the shape of the current block is a vertical rectangle, the PDPC parameter set corresponding to the specific index set may be the first parameter set. In this case, for at least some of the samples constituting the current block, the first parameter set may be a PDPC parameter set in which a parameter applied to an upper reference value obtained from an upper reference sample of the current block is configured with a non-zero value. For example, the first parameter set may be a PDPC parameter set applied when the intra prediction mode of the current block is a horizontal diagonal neighboring mode. That is, the first parameter set may be the same parameter set as in [Equation 4] described above through FIG. 15.

According to an embodiment, when the shape of the current block is a horizontal rectangle, the PDPC parameter set corresponding to the specific index set may be the second parameter set. In this case, the first parameter set and the second parameter set may be different PDPC parameter sets. In addition, for at least some of the samples constituting the current block, the second parameter set may be a PDPC parameter set in which a parameter applied to a left reference value obtained from a left reference sample of the current block is configured with a non-zero value. For example, the second parameter set may be a PDPC parameter set applied when the intra prediction mode of the current block is a vertical diagonal neighboring mode. That is, the second parameter set may be the same parameter set as in [Equation 5] described above through FIG. 15.

According to a specific embodiment, the PDPC parameter set corresponding to the first index set may be the first parameter set when the current block is a square block or a vertically rectangular block. Also, the PDPC parameter set corresponding to the first index set may be a second parameter set when the current block is a horizontally rectangular block.

According to a specific embodiment, the PDPC parameter set corresponding to the second index set may be the second parameter set when the current block is a square block or a horizontally rectangular block. Also, the PDPC parameter set corresponding to the second index set may be a first parameter set when the current block is a vertically rectangular block.

According to a specific embodiment, the PDPC parameter set corresponding to the third index set may be the third parameter set when the current block is a square block or a vertically rectangular block. The third parameter set may be a PDPC parameter set applied when the intra prediction mode of the current block is a horizontal diagonal mode or a vertical diagonal mode. That is, the third parameter set may be the same parameter set as in [Equation 3] described above through FIG. 14. Also, the PDPC parameter set corresponding to the third index set may be a second parameter set when the current block is a horizontally rectangular block.

According to a specific embodiment, the PDPC parameter set corresponding to the fourth index set may be the third parameter set when the current block is a square block or a vertically rectangular block. Also, the PDPC parameter set corresponding to the fourth index set may be a first parameter set when the current block is a horizontally rectangular block.

FIG. 17 is a diagram illustrating an embodiment of a PDPC parameter set according to the shape of a current block for each intra prediction mode index. FIG. 17(a) shows a PDPC parameter set used for each intra prediction mode index when the ratio of width and height (W/H) of the current block is 1. Referring to FIG. 17(a), when the intra prediction mode index of the current block is any one of the first index set 3, . . . , 7, PDPC linear combining may be performed based on the first parameter set. In addition, when the intra prediction mode index of the current block is any one of the second index sets 61, . . . , 65, PDPC linear combining may be performed based on the second parameter set. Also, the PDPC parameter set corresponding to the third index set 2 and the fourth index set 66 may be a third parameter set.

FIG. 17(b) shows a PDPC parameter set used for each intra prediction mode index when the ratio of width and height (W/H) of the current block is 2. Referring to FIG. 17(b), when the intra prediction mode index of the current block is one of the third index set 2, the first index set 3, . . . , 7 and the second index set 61, . . . , 65, PDPC linear combining may be performed based on the second parameter set. Also, the PDPC parameter set corresponding to the fourth index set 66 may be a third parameter set.

Also, when the ratio of width and height (W/H) of the current block is ½: i) When the intra prediction mode index of the current block is one of the third index set 2, the first index set 3, . . . , 7, and the second index set 61, . . . , 65, PDPC linear combining may be performed based on the first parameter set. ii) When the intra prediction mode index of the current block is the fourth index set, PDPC linear combining may be performed based on the third parameter set.

According to a further embodiment of the present invention, when the longer one of the width and height of the current block exceeds twice the shorter side, intra prediction mode indexes indicating different intra prediction modes may be added according to the shape of the current block. For example, when the ratio (W/H) between the width and height of the current block is less than or equal to 2, at least one intra prediction mode index indicates one of the basic angular modes, and when the ratio (W/H) exceeds 2, the at least one intra prediction mode index may indicate any one of wide-angular modes. In this case, the number of indexes to be added may be determined based on the number of wide-angular modes pre-configured for each ratio of width and height of the current block.

For example, when the ratio of width and height of the current block is 3 or ⅓, the number of pre-configured wide-angular modes may be 9 with 3 added compared to when the ratio of width and height of the current block is 2 or ½. That is, when the ratio (W/H) between the width and height of the current block is less than 3, the fifth index set 8, 9, 10 and the sixth index set 58, 59, 60 may indicate any one of the basic angular modes, and when the ratio (W/H)

is 3 or more, they may indicate any one of the wide-angular modes. Accordingly, when the ratio of the width and height of the current block is 3 or more, and the intra prediction mode index of the current block is any of the fifth indexes 8, 9, and 10, PDPC linear combining may be performed based on the second parameter set. Unlike this, if the ratio (W/H) of the width and height of the current block is less than 3, and the intra prediction mode index of the current block is any one of the fifth indexes 8, 9, and 10, PDPC linear combining may be performed based on the first parameter set.

In addition, when the ratio of the width and height of the current block is ⅓ or less, and the intra prediction mode index of the current block is any one of the sixth indexes 58, 59, and 60, PDPC linear combining may be performed based on the first parameter set. Unlike this, if the ratio (W/H) of the width and height of the current block exceeds ⅓, and the intra prediction mode index of the current block is any one of the fifth indexes 8, 9, and 10, PDPC linear combining may be performed based on the second parameter set.

Also, when the ratio of width and height of the current block is 4 or ¼, the number of pre-configured wide-angular modes may be 10 in which is added compared to the number of pre-configured wide-angular modes when the ratio of width and height of the current block is 3 or ⅓. That is, indexes 11 and 57 may be indexes indicating a basic angular mode or a wide-angular mode according to the shape of the current block. When the ratio of the width and height of the current block is 4 or more, and the intra prediction mode index of the current block is 11, PDPC linear combining may be performed based on the second parameter set. If the ratio of the width and height of the current block is less than 4, and the intra prediction mode index of the current block is 11, PDPC may not be applied. When the ratio of the width and height of the current block is less than ¼, and the intra prediction mode index of the current block is 57, PDPC linear combining may be performed based on the first parameter set. If the ratio of the width and height of the current block exceeds ¼, and the intra prediction mode index of the current block is 57, PDPC may not be applied.

Alternatively, when the longer one of the width and height of the current block exceeds twice the short side, the number of wide-angular modes may be fixed to a specific number. For example, the pre-configured number may be up to 14. Hereinafter, for convenience of description, a case where the pre-configured number is 10 will be described as an example.

According to one embodiment, when the ratio of width and height (W/H) of the current block exceeds 2: When the intra prediction mode index of the current block is one of the first index set 3, . . . , 7 and the indexes 8, . . . , 11, PDPC linear combining may be performed based on the second parameter set. In addition, when the intra prediction mode index of the current block is any one of the second index set 61, . . . , 65 and the indexes 58, . . . , 60, PDPC linear combining may be performed based on the second parameter set. In addition, if the intra prediction mode index of the current block is index 57, PDPC may not be applied.

According to another embodiment, when the ratio of width and height (W/H) of the current block is less than ½: When the intra prediction mode index of the current block is one of the first index set 3, . . . , 7 and the indexes 8, . . . , 10, PDPC linear combining may be performed based on the first parameter set. In addition, if the intra prediction mode index of the current block is index 11, PDPC may not be applied. In addition, if the intra prediction mode index of the current block is any one of the second index set 61, . . . , 65 and the indexes 57, . . . , 60, PDPC linear combining may be performed based on the first parameter set.

FIG. 18 is a diagram illustrating another embodiment of a PDPC parameter set according to the shape of a current block for each intra prediction mode index. According to an embodiment, when the intra prediction mode of the current block is wide-angular mode, a third parameter set may be used. In this case, the third parameter set may be a set used when the intra prediction mode of the current block is a vertical diagonal mode or a horizontal diagonal mode. Accordingly, the PDPC parameter set corresponding to the specific index set may be configured in a different way from FIG. 17 according to the shape of the current block.

FIG. 18(a) shows a PDPC parameter set used for each intra prediction mode index when the ratio of width and height (W/H) of the current block is 1. Referring to FIG. 18(a), when the intra prediction mode index of the current block is any one of the first index set 3, . . . , 7, PDPC linear combining may be performed based on the first parameter set. In addition, when the intra prediction mode index of the current block is any one of the second index sets 61, . . . , 65, PDPC linear combining may be performed based on the second parameter set.

FIG. 18(b) shows a PDPC parameter set used for each intra prediction mode index when the ratio of width and height (W/H) of the current block is 2. Referring to FIG. 18(b), when the intra prediction mode index of the current block is any one of the first index set 3, . . . , 7, PDPC linear combining may be performed based on the third parameter set. In addition, if the intra prediction mode index of the current block is any one of the second index sets 61, . . . , 65, PDPC linear combining may be performed based on the second parameter set.

In addition, when the ratio of width and height (W/H) of the current block is ½, and the intra prediction mode index of the current block is one of the first index sets 3, . . . , 7, PDPC linear combining may be performed based on the first parameter set. In addition, when the ratio of width and height (W/H) of the current block is ½, and the intra prediction mode index of the current block is one of the second index sets 61, . . . , 65, PDPC linear combining may be performed based on the third parameter set.

According to a further embodiment of the present invention, the number of angular modes constituting each of the aforementioned horizontal diagonal neighboring mode set and vertical diagonal neighboring mode set may be configured differently according to the shape of the current block. For example, when the longest one of the width and height of the current block is twice the shorter one, the number of angular modes constituting each of the horizontal diagonal neighboring mode set and the vertical diagonal neighboring mode set may be set to N. According to an embodiment of the present invention, N may be 8. Furthermore, when the longest one of the width and height of the current block exceeds twice the shorter one, the number of angular modes constituting each of the horizontal diagonal neighboring mode set and the vertical diagonal neighboring mode set may be set to M. In this case, M may be an integer greater than N. For example, M may be 10. Also, the number of angular modes constituting the horizontal diagonal neighboring mode set and the number of angular modes constituting the vertical diagonal neighboring mode set may be configured differently. For example, when the width of the current block is greater than the height, the number of angular modes constituting the horizontal diagonal neigh-boring mode set may be configured to be greater than the number of angular modes constituting the vertical diagonal neighboring mode set. Conversely, when the height of the current block is greater than the width, the number of angular modes constituting the horizontal diagonal neighboring mode set may be configured to be greater than the number of angular modes constituting the vertical diagonal neighboring mode set.

Figure 19:
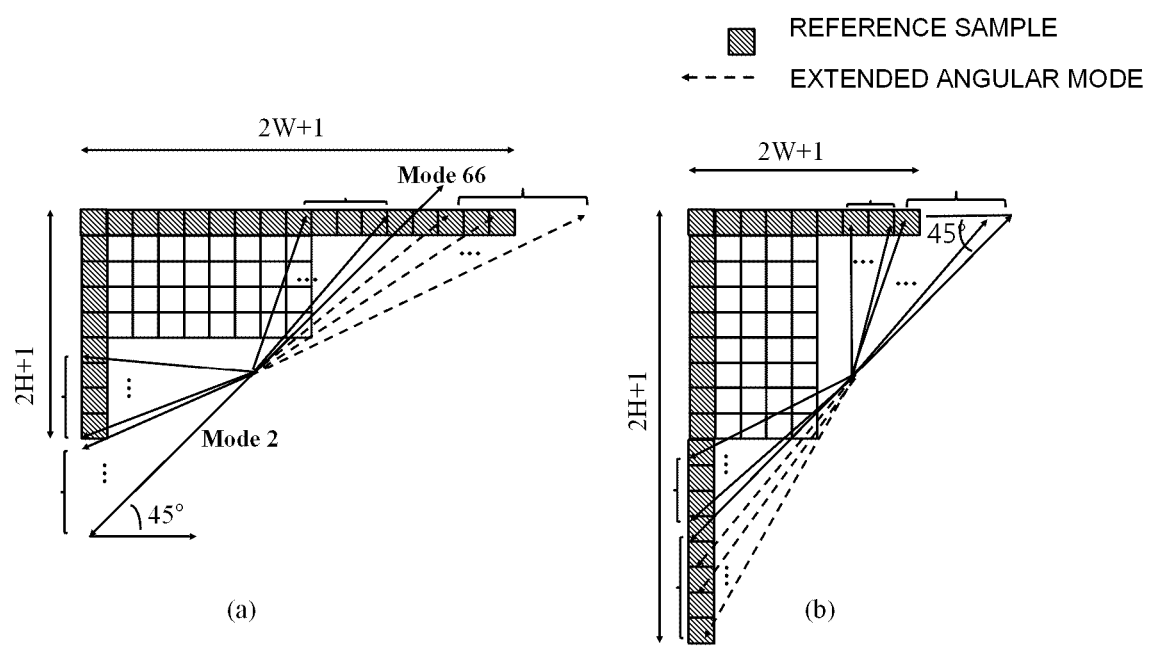
FIG. 19 is a diagram illustrating an embodiment of an angular mode to which PDPC is applied when a basic angular mode is replaced by a wide-angular mode according to the shape of a current block.

FIG. 19 is a diagram illustrating an embodiment of an angular mode to which PDPC is applied when a basic angular mode is replaced by a wide-angular mode according to the shape of a current block. Each of the horizontal diagonal neighboring mode set and the vertical diagonal neighboring mode set may include a pre-configured number of basic angular modes. Hereinafter, for convenience of description, a case where the number of pre-configured numbers is 8 will be described as an example.

FIG. 19(a) illustrates a method of changing a configuration of a horizontal diagonal neighboring mode set when some of basic angular modes included in the horizontal diagonal neighboring mode set are replaced by wide-angular modes. If the current block has a horizontally rectangular block, some of the basic angular modes included in the horizontal diagonal neighboring mode set may be replaced by the wide-angular modes with an angle exceeding 45 degrees in a clockwise direction. In this case, the horizontal diagonal neighboring mode set may be reconfigured based on the number of basic angular modes replaced by the wide-angular mode. That is, the horizontal diagonal neighboring mode set may be configured differently according to the shape of the current block.

According to an embodiment, when the shape of the current block is square or vertical rectangle, there is no basic angular mode that is replaced by the wide-angular mode among the modes constituting the horizontal diagonal neighboring mode set. In this case, the horizontal diagonal neighboring mode set may be composed of basic angular modes 3, . . . , 10.

According to another embodiment, when the ratio of width and height (W/H) of the current block is 2, the number of angular modes replaced by the wide-angular mode may be six. In this case, the horizontal diagonal neighboring mode set may include basic angular modes 8, . . . , 15. According to another embodiment, when the ratio of width and height (W/H) of the current block exceeds 2, the number of angular modes replaced by the wide-angular mode may be 10. In this case, the horizontal diagonal neighboring mode set may include basic angular modes 12, 13, 14, 15, 16, 17, 19, 20. In this case, since the basic angular mode 18 is a horizontal mode, it may be excluded.

FIG. 19(b) illustrates a method of changing a configuration of a vertical diagonal neighboring mode set when some of basic angular modes included in the vertical diagonal neighboring mode set are replaced by wide-angular modes. If the shape of the current block is a vertically rectangular block, some of the basic angular modes constituting the vertical diagonal neighboring mode set may be replaced by a wide-angular mode with an angle of less than −135 degrees in a clockwise direction. In this case, the vertical diagonal neighboring mode set may be reconfigured based on the number of basic angular modes replaced by the wide-angular mode. That is, the vertical diagonal neighboring mode set may be configured differently according to the shape of the current block.

According to an embodiment, when the shape of the current block is square or horizontal rectangle, there is no basic angular mode that is replaced by the wide-angular mode among the modes constituting the vertical diagonal neighboring mode set. In this case, the vertical diagonal neighboring mode set may be composed of basic angular modes 58, . . . , 66.

According to another embodiment, when the ratio of width and height (W/H) of the current block is ½, the number of angular modes replaced by the wide-angular mode may be six. In this case, the vertical diagonal neighboring mode set may include basic angular modes 53, . . . , 60. According to another embodiment, when the ratio of width and height (W/H) of the current block is less than ½, the number of angular modes replaced by the wide-angular mode may be ten. In this case, the vertical diagonal neighboring mode set may include the basic angular modes 48, 49, 51, 52, 53, 54, 55, 56. In this case, since the basic angular mode 50 is a vertical mode, it may be excluded.

Figure 20:
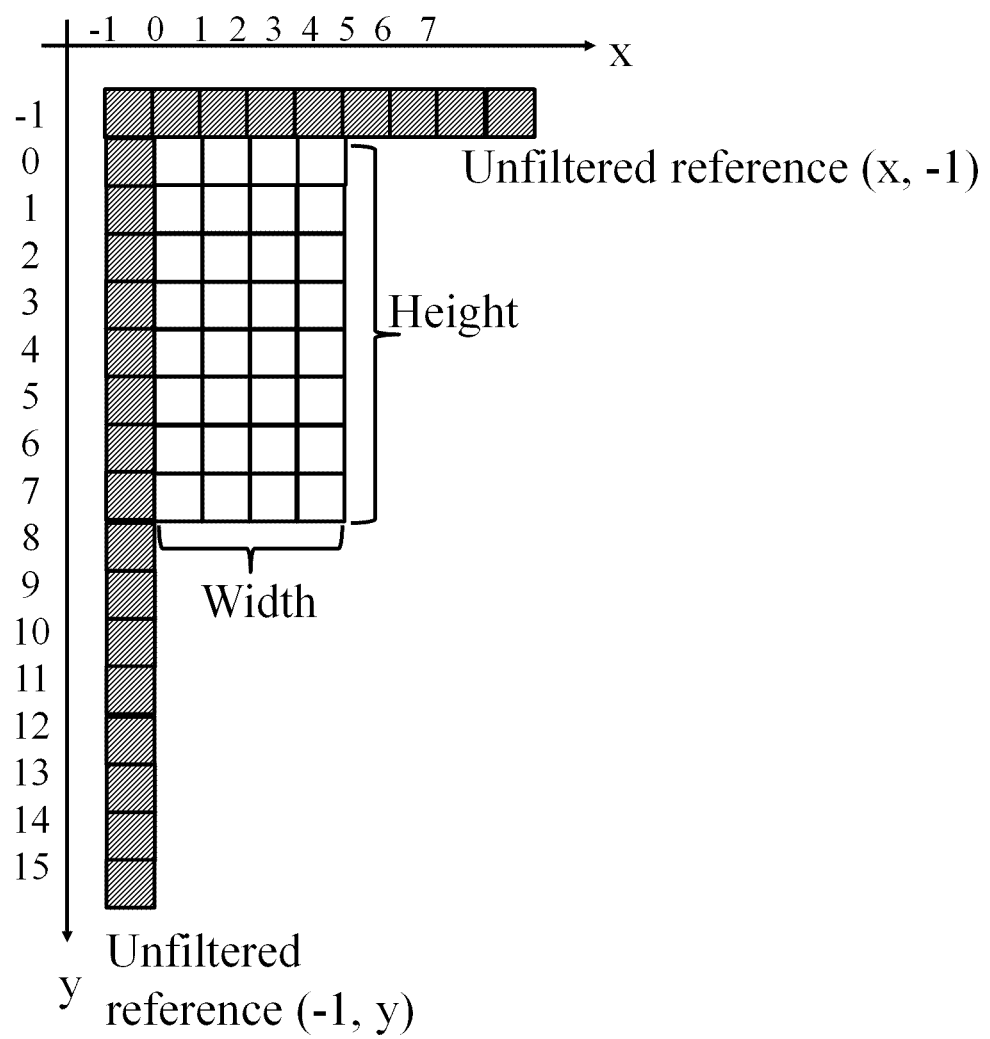
FIG. 20 is a diagram illustrating an embodiment of a method in which the PDPC parameter set is modified when the current block is a rectangular block.

FIG. 20 is a diagram illustrating an embodiment of a method in which the PDPC parameter set is modified when the current block is a rectangular block. When the current block is square, the PDPC parameter set described through FIGS. 12 to 15 may be used. According to an embodiment of the present invention, when the current block is not square, the shift values of FIGS. 12 to 15 may be modified by any one of [Equation 6] below. In [Equation 6], width is the width of the current block, and height is the height of the current block.

$$\text{shift}=\min(\log 2(\text{Width}), \log 2(\text{Height})), \text{ or}$$

$$\text{shift}=\max(\log 2(\text{Width}), \log 2(\text{Height})), \text{ or}$$

$$\text{shift}=\log 2(\text{Width}) \text{ for } wL[x] \text{ and, } \log 2(\text{Height}) \text{ for } wT[y], \text{ or}$$

$$\text{shift}=\log 2(\text{Height}) \text{ for } wL[x] \text{ and, } \log 2(\text{Width}) \text{ for } wT[y]$$

Figure 21:
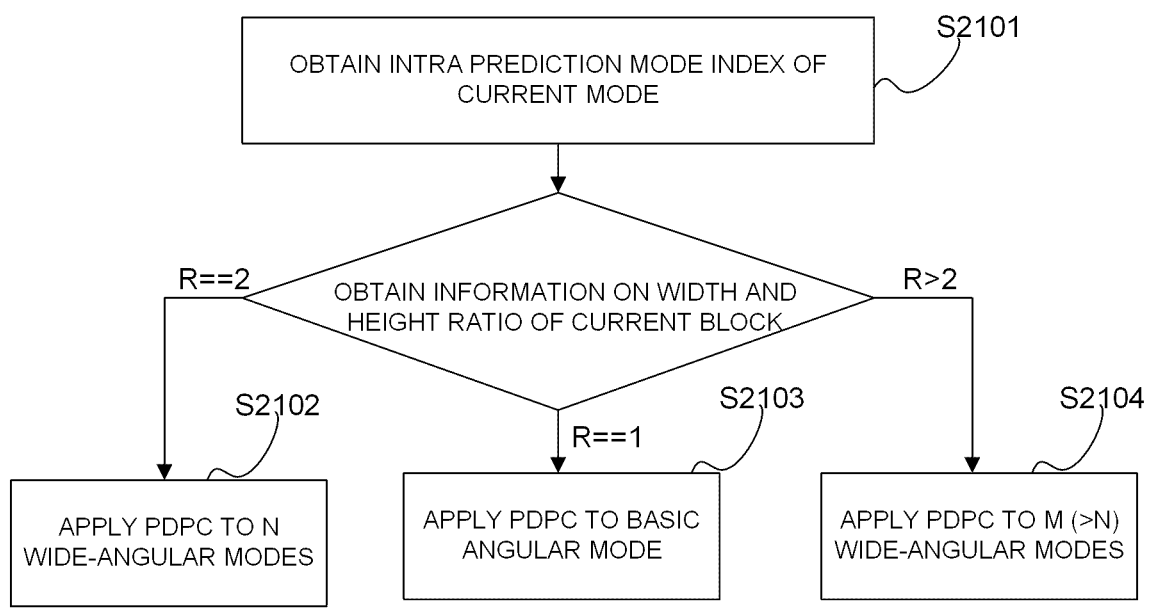
FIG. 21 is a flowchart illustrating a method for a video signal processing device to determine, for prediction block generation of a current block, a PDPC reference value and a PDPC parameter set.

FIG. 21 is a flowchart illustrating a method for a video signal processing device to determine a PDPC reference value and a PDPC parameter set for prediction block generation of a current block. The encoder may signal intra prediction mode information. The decoder may obtain the intra prediction mode index of the current block based on the intra prediction mode information from the received bitstream (S2101). Also, the decoder may determine a method of applying PDPC based on shape information of the current block. The shape information of the current block may include at least one of width, height, or ratio of width to height. In FIG. 21, the ratio information R of the width and height may be a value obtained by dividing the longer one by the shorter one among the width and height of the current block.

According to an embodiment, when the ratio information R of the width and height of the current block is 2 (S2102), N specific indexes may indicate wide-angular modes. In this case, when the intra prediction mode for the current block is any one of the N specific indexes, the decoder may generate the final prediction block of the current block by applying PDPC in the manner described above with reference to FIGS. 16 and 17. Or, when the intra prediction mode for the current block is one of the indexes other than N specific indexes, the decoder may generate a final prediction block of the current block by applying PDPC through the method described with reference to FIGS. 14 to 17.

According to another embodiment, when the ratio information R of the width and height of the current block is 1 (S2103), the intra prediction mode indexes may indicate angular modes within a basic angle range. The decoder may generate a final prediction block of the current block by applying PDPC through the method described with reference to FIGS. 14 to 17.

According to another embodiment, when the ratio information R of the width and height of the current block exceeds 2 (S2104), M specific indexes may indicate wide-angular modes. In this case, M may be an integer greater than N. In this case, if the intra prediction mode for the current block is any one of the N specific indexes, the decoder may generate the final prediction block of the current block by applying PDPC in the manner described above with reference to FIGS. 16 and 17. Or, if the intra prediction mode for the current block is one of the indexes other than M specific indexes, the decoder may generate a final prediction block of the current block by applying PDPC through the method described with reference to FIGS. 14 to 17.

In the above-described embodiments, the reference sample is illustrated as samples included in the reference line adjacent to the current block, but the present disclosure is not limited thereto. As described above, the encoder and decoder according to an embodiment of the present invention may use samples on n reference lines within a predetermined distance from the boundary of the current block as reference samples for intra prediction of the current block.

Meanwhile, when a final prediction sample of the current block is generated by applying PDPC, the first prediction sample, which is an intermediate prediction sample, may be generated using reference samples filtered with a pre-configured filter. Specifically, the first prediction sample may be generated based on the intra prediction mode and sample values of the filtered reference sample. Specifically, reference sample filtering may be performed based on any one of pre-configured low-pass filters. The pre-configured low-pass filter may be classified according to the filter order as shown in the table below.

TABLE 1

| K: filter order | Filter | Filter coefficients |
| --- | --- | --- |
| 1 | 3-tap | {1, 2, 1} |
| 2 | 5-tap | {1, 4, 6, 4, 1} |
| 3 | 7-tap | {1, 6, 15, 20, 15, 6, 1} |
| 5 | | {3, 7, 14, 16, 14, 7, 3} |
| 7 | | {4, 9, 12, 14, 12, 9, 4} |

The encoder and decoder may generate a first prediction sample for PDPCP linear combining based on the filtered reference sample values (s[−1,y], s[x,−1]).

Moreover, at least some of the reference samples for intra prediction may not be available according to the scan order, the block partition, and the position of the current block. This is because, according to a reconstruction order of blocks in a picture, one or more non-reconstructed reference samples that have not been reconstructed may exist at a time point predicting the current block. Or, when it is necessary to refer to the outside of the picture boundary due to the location of the current block, at least some of the reference samples may not exist.

In the present disclosure, the case where the reference sample is not available includes the case where the reference sample has not been restored and the reference sample does not exist. If at least some reference samples are not available, reference sample padding may be performed. However, when the entire reference sample is not available, an intermediate value of the representable range of the current picture may be used based on the bit depth. In this case, prediction performance may be deteriorated compared to prediction based on available reference samples. Hereinafter, when a boundary of the current block is adjacent to a boundary of at least one (hereinafter, a high-level region) of a picture, slice/tile, or CTU, a method of configuring a reference sample of the current block will be described.

Figure 22:
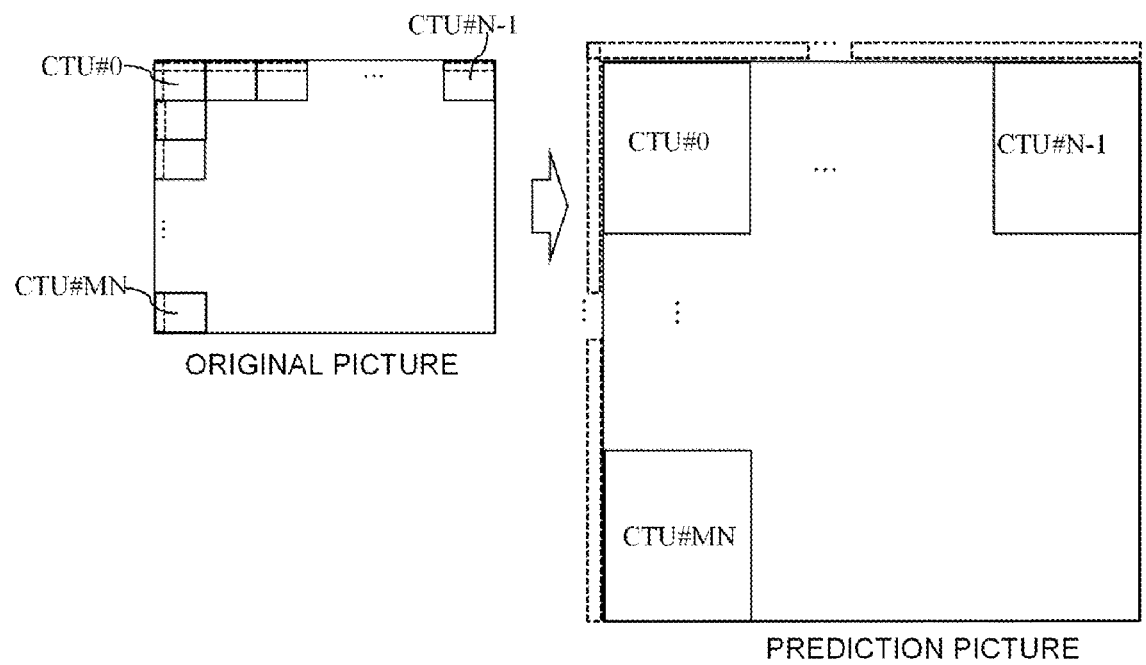
FIG. 22 is a diagram illustrating an embodiment of a method of obtaining a reference sample for intra prediction of a current block when a boundary of a current block is adjacent to a boundary of a high-level region.

FIG. 22 is a diagram illustrating an embodiment of a method of obtaining a reference sample for intra prediction of a current block when a boundary of a current block is adjacent to a boundary of a high-level region. According to an embodiment of the present invention, when the upper and left reference samples of the current block are not available, a reference sample may be obtained based on the original sample value corresponding to the current block. For example, the encoder may signal the original sample values on the first line inside the current CTU boundary including the current block. The encoder may transmit original sample values of the uppermost line and original sample values of the leftmost line in the current CTU. In addition, the encoder may transmit original sample values of the uppermost line and original sample values of the leftmost line corresponding to the current block. In this case, the original sample values of the plurality of lines may be additionally transmitted from the upper side of the original picture to the downward direction and the original sample values of the plurality of lines may be additionally transmitted from left to right of the original picture. The decoder may obtain a reference sample of the current block based on the received original sample value.

Figure 23:
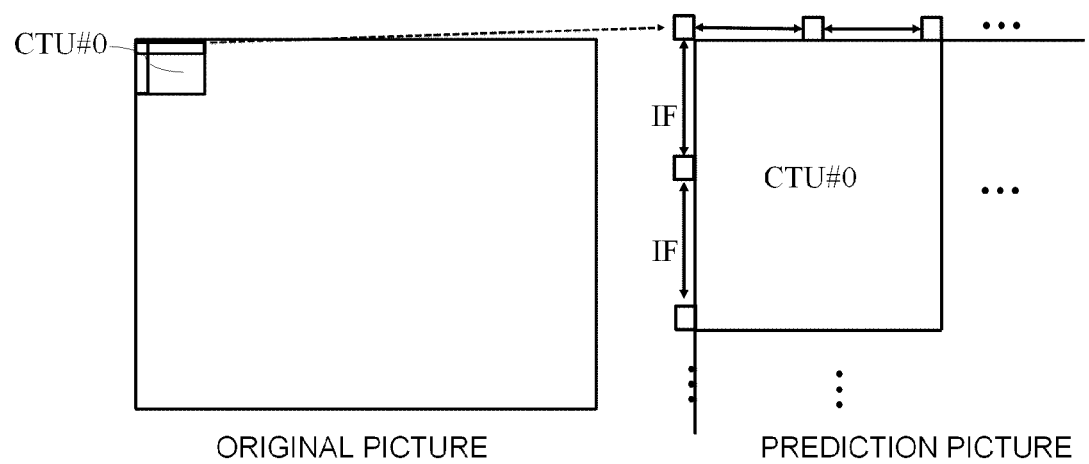
FIG. 23 is a diagram illustrating an additional embodiment of a method of obtaining a reference sample for intra prediction of a current block when a boundary of a current block is adjacent to a boundary of a high-level region.

FIG. 23 is a diagram illustrating an additional embodiment of a method of obtaining a reference sample for intra prediction of a current block when a boundary of a current block is adjacent to a boundary of a high-level region. As illustrated in FIG. 22, when signaling all original sample values on the first line inside the boundary of the original picture or the CTU, the compression efficiency of the video signal may be deteriorated. According to a further embodiment of the present invention, the encoder may signal the values of some original samples corresponding to a specific position among the original pictures or original samples on the first line inside the boundary of the CTU. The decoder may configure a reference sample of the current block based on the received original sample value.

According to an embodiment, a specific position may include a position of an original picture or an upper left sample inside a CTU boundary. In addition, a specific position may include a position of samples spaced at pre-configured intervals among original samples of the original picture or the first line inside the CTU boundary. For example, as illustrated in FIG. 23, original sample values corresponding to two positions and one upper left position on the upper line and the left line may be signaled, respectively. The decoder may configure a reference sample array including W+H+1 or 2W+2H+1 reference samples based on the original sample value of a specific position obtained. Specifically, a reference sample array may be configured based on interpolation of original sample values of a specific position obtained. In this case, various methods such as a linear interpolation method using two sample values, a bi-linear interpolation method, a padding method, a method of using multiple tap filter coefficients based on the number of samples, or a method of generating and applying DCT-based interpolation filter coefficients used in HEVC (H.265) may be used for interpolation of sample values.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

The invention claimed is:

1. A video signal decoding method comprising:
    generating, based on an intra prediction mode for a current block, a first prediction sample of a current sample included in the current block, wherein the intra prediction mode for the current block is indicated through any one of at least one intra prediction mode index included in a specific index set;
    determining at least one reference sample corresponding to the current sample among reference samples of the current block based on the intra prediction mode for the current block;
    obtaining at least one reference value corresponding to the current sample based on an unfiltered sample value of the at least one reference sample;
    determining a parameter set based on a width of the current block, a height of the current block, whether an index of the intra prediction mode is smaller than a pre-configured first index, and whether the index of the intra prediction mode is greater than a pre-configured second index;
    generating a second prediction sample by linearly combining a value of the first prediction sample and the at least one reference value based on the determined parameter set, wherein the determined parameter set is used for determining a weight which is used for linearly combining the value of the first prediction sample and the at least one reference value; and
    restoring the current sample based on a residual signal of the current sample and the second prediction sample.

2. The method of claim 1, wherein the specific index set is one of a plurality of index sets including a first index set and a second index set,
    wherein the first index set includes an index of the intra prediction mode that is smaller than the pre-configured first index, wherein the second index set includes an index of the intra prediction mode that is greater than the pre-configured second index,
    wherein the pre-configured first index and the pre-configured second index are configured values based on the number of pre-configured wide-angular modes when the longer one of a width and height of the current block is twice the shorter one,
    wherein a wide-angular mode is an angular mode outside a pre-configured reference angle range.

3. The method of claim 2, wherein for at least some of the samples included in the current block, in a first parameter set corresponding to the first index set, a parameter applied to an upper reference value obtained from an upper reference sample of the current block among the at least one reference value is not 0,
    wherein for at least some of the samples included in the current block, in a second parameter set corresponding to the second index set, a parameter applied to a left reference value obtained from a left reference sample of the current block among the at least one reference value is not 0.

4. The method of claim 3, wherein the index indicating the intra prediction mode of the current block is any one of indexes included in the first index set,
    wherein the generating the second prediction sample comprises, when the shape of the current block is a square, generating the second prediction sample based on the first parameter set.

5. The method of claim 3, wherein the index indicating the intra prediction mode of the current block is any one of indexes included in the second index set,
    wherein the generating the second prediction sample comprises, when the shape of the current block is a square, generating the second prediction sample based on the second parameter set.

6. The method of claim 1, wherein the specific index set is a third index set composed of the smallest index among intra prediction mode indexes indicating an angular mode,
    wherein when the shape of the current block is a square or vertical rectangle, a parameter applied to a left reference value of a third parameter set corresponding to the third index set is not 0,
    wherein when the shape of the current block is a horizontal rectangle, the parameter applied to the left reference value of the third parameter set corresponding to the third index set is 0.

7. The method of claim 1, wherein the specific index set is a fourth index set composed of the largest index among intra prediction mode indexes indicating an angular mode,
    wherein when the shape of the current block is a square or horizontal rectangle, a parameter applied to an upper reference value of a fourth parameter set corresponding to the fourth index set is not 0,
    wherein when the shape of the current block is a vertical rectangle, the parameter applied to the upper reference value of the fourth parameter set corresponding to the fourth index set is 0.

8. The method of claim 1, wherein the obtaining the at least one reference value corresponding to the current sample comprises:

determining a first position where an opposite direction of a prediction direction indicated by the intra prediction mode for the current block and one of the reference lines of the current block intersect based on a direction of the current sample, obtaining a reference value corresponding to the first position based on a distance between the first position and the first reference sample and a distance between the first position and the second reference sample.

9. A video signal decoding device comprising a processor, wherein the processor is configured to:

generate, based on an intra prediction mode for the current block, a first prediction sample of a current sample included in a current block, wherein the intra prediction mode for the current block is indicated through any one of at least one intra prediction mode index included in a specific index set;

determine at least one reference sample corresponding to the current sample among reference samples of the current block based on the intra prediction mode for the current block;

obtain at least one reference value corresponding to the current sample based on an unfiltered sample value of the at least one reference sample;

determine a parameter set based on a width of the current block, a height of the current block, whether an index of the intra prediction mode is smaller than a pre-configured first index, and whether the index of the intra prediction mode is greater than a pre-configured second index;

generate a second prediction sample by linearly combining a value of the first prediction sample and the at least one reference value based on the determined parameter set, wherein the determined parameter set is used for determining a weight which is used for linearly combining the value of the first prediction sample and the at least one reference value; and restore the current sample based on a residual signal of the current sample and the second prediction sample.

10. The device of claim 9, wherein the specific index set is one of a plurality of index sets including a first index set and a second index set, wherein the first index set includes an index of the intra prediction mode that is smaller than the pre-configured first index, wherein the second index set includes an index of the intra prediction mode that is greater than the pre-configured second index, wherein the pre-configured first index and the pre-configured second index are configured values based on the number of pre-configured wide-angular modes when the longer one of a width and height of the current block is twice the shorter one, wherein a wide-angular mode is an angular mode outside a pre-configured reference angle range.

11. The device of claim 10, wherein for at least some of the samples included in the current block, in a first parameter set, a parameter applied to an upper reference value obtained from an upper reference sample of the current block among the at least one reference value is not 0, wherein for at least some of the samples included in the current block, in a second parameter set, a parameter applied to a left reference value obtained from a left reference sample of the current block among the at least one reference value is not 0.

12. The device of claim 11, wherein the index indicating the intra prediction mode of the current block is any one of indexes included in the first index set, wherein when the shape of the current block is a square, the processor is configured to generate the second prediction sample based on the first parameter set.

13. The device of claim 11, wherein the index indicating the intra prediction mode of the current block is any one of indexes included in the second index set, wherein when the shape of the current block is a square, the processor is configured to generate the second prediction sample based on the second parameter set.

14. The device of claim 9, wherein the specific index set is a third index set composed of the smallest index among intra prediction mode indexes indicating an angular mode, wherein when the shape of the current block is a square or vertical rectangle, a parameter applied to a left reference value of a third parameter set corresponding to the third index set is not 0, wherein when the shape of the current block is a horizontal rectangle, the parameter applied to the left reference value of the third parameter set corresponding to the third index set is 0.

15. The device of claim 9, wherein the specific index set is a fourth index set composed of the largest index among intra prediction mode indexes indicating an angular mode, wherein when the shape of the current block is a square or horizontal rectangle, a parameter applied to an upper reference value of a fourth parameter set corresponding to the fourth index set is not 0, wherein when the shape of the current block is a vertical rectangle, the parameter applied to the upper reference value of the fourth parameter set corresponding to the fourth index set is 0.

16. The device of claim 9, wherein when a first position is a position where an opposite direction of a prediction direction indicated by the intra prediction mode for the current block and one of the reference lines of the current block intersect based on a direction of the current sample, the processor is configured to obtain a reference value corresponding to the first position based on a distance between the first position and the first reference sample and a distance between the first position and the second reference sample.

17. A video signal encoding apparatus comprising a processor, wherein processor is configured to:

generate, based on an intra prediction mode for a current block, a first prediction sample of a current sample included in the current block, wherein the intra prediction mode for the current block is indicated through any one of at least one intra prediction mode index included in a specific index set;

determine at least one reference sample corresponding to the current sample among reference samples of the current block based on the intra prediction mode for the current block;

obtain at least one reference value corresponding to the current sample based on an unfiltered sample value of the at least one reference sample;

determine a parameter set based on a width of the current block, a height of the current block, whether an index of the intra prediction mode is smaller than a pre-configured first index, and whether the index of the intra prediction mode is greater than a pre-configured second index;

generate a second prediction sample by linearly combining a value of the first prediction sample and the at least one reference value based on the determined parameter set, wherein the determined parameter set is used for determining a weight which is used for linearly combining the value of the first prediction sample and the at least one reference value; and restore the current sample based on a residual signal of the current sample and the second prediction sample.

18. A non-transitory computer-readable medium storing a bitstream, the bitstream being decoded by a decoding method, wherein the decoding method, comprising:

generating, based on an intra prediction mode for a current block, a first prediction sample of a current sample included in the current block, wherein the intra prediction mode for the current block is indicated through any one of at least one intra prediction mode index included in a specific index set;

determining at least one reference sample corresponding to the current sample among reference samples of the current block based on the intra prediction mode for the current block;

obtaining at least one reference value corresponding to the current sample based on an unfiltered sample value of the at least one reference sample;

determine a parameter set based on a width of the current block, a height of the current block, whether an index of the intra prediction mode is smaller than a pre-configured first index, and whether the index of the intra prediction mode is greater than a pre-configured second index;

generate a second prediction sample by linearly combining a value of the first prediction sample and the at least one reference value based on the determined parameter set, wherein the determined parameter set is used for determining a weight which is used for linearly combining the value of the first prediction sample and the at least one reference value; and restoring the current sample based on a residual signal of the current sample and the second prediction sample.

* * * * *